United States Patent
Shin et al.

(10) Patent No.: US 12,418,329 B2
(45) Date of Patent: Sep. 16, 2025

(54) APPARATUS AND METHOD FOR SIDELINK BEAM OPERATION IN WIRELESS COMMUNICATION SYSTEM

(71) Applicant: SAMSUNG ELECTRONICS CO., LTD., Suwon-si (KR)

(72) Inventors: Cheolkyu Shin, Suwon-si (KR);
Jeongho Yeo, Suwon-si (KR);
Taehyoung Kim, Suwon-si (KR);
Youngrok Jang, Suwon-si (KR);
Hyunseok Ryu, Suwon-si (KR);
Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 471 days.

(21) Appl. No.: 17/756,356

(22) PCT Filed: Nov. 17, 2020

(86) PCT No.: PCT/KR2020/016127
§ 371 (c)(1),
(2) Date: May 23, 2022

(87) PCT Pub. No.: WO2021/101196
PCT Pub. Date: May 27, 2021

(65) Prior Publication Data
US 2022/0399917 A1    Dec. 15, 2022

(30) Foreign Application Priority Data
Nov. 22, 2019   (KR) .................. 10-2019-0151750

(51) Int. Cl.
*H04B 7/0408*     (2017.01)
*H04B 7/06*       (2006.01)
(Continued)

(52) U.S. Cl.
CPC ......... *H04B 7/0408* (2013.01); *H04B 7/0617* (2013.01); *H04B 7/0695* (2013.01);
(Continued)

(58) Field of Classification Search
CPC .. H04B 7/0408; H04B 7/0617; H04B 7/0695; H04B 7/088; H04B 17/318; H04B 17/382; H04L 1/1812
See application file for complete search history.

(56) References Cited

U.S. PATENT DOCUMENTS

| 11,101,863 B2    | 8/2021 | Kang et al. |
| 2020/0236730 A1  | 7/2020 | Shin et al. |

(Continued)

FOREIGN PATENT DOCUMENTS

| EP | 3 720 026 A1    | 7/2020 |
| KR | 10-2019-0017643 A | 2/2019 |

(Continued)

OTHER PUBLICATIONS

International Search Report and Written Opinion of the International Searching Authority in connection with International Application No. PCT/KR2020/016127 issued Mar. 9, 2021, 9 pages.

(Continued)

*Primary Examiner* — Redentor Pasia

(57) ABSTRACT

The present disclosure relates to a 5$^{th}$ generation (5G) or pre-5G communication system for supporting a higher data transmission rate after a 4$^{th}$ generation (4G) communication system such as Long Term Evolution (LTE). Various embodiments of the present disclosure propose a method for performing beam operation in consideration of a communication environment in a sidelink. According to various embodiments of the present disclosure, by proposing a method for performing beam operation when sidelink communication operates at a high frequency, coverage may be (Continued)

improved. According to various embodiments of the present disclosure, an operating method of a first terminal in a wireless communication system is provided, the method comprising the steps of: establishing a connection with a second terminal; periodically transmitting a sidelink channel state information reference signal (SL CSI-RS) to the second terminal; receiving, from the second terminal, preferred beam information on the basis of the SL CSI-RS; transmitting a signal to the second terminal with a beam formed on the basis of the beam information; and receiving acknowledgement/not-acknowledgement (ACK/NACK) information for the signal from the second terminal.

12 Claims, 30 Drawing Sheets

(51) Int. Cl.
　　*H04B 7/08*　　　(2006.01)
　　*H04B 17/318*　　(2015.01)
　　*H04B 17/382*　　(2015.01)
　　*H04L 1/1812*　　(2023.01)
　　*H04L 5/00*　　　(2006.01)
　　*H04W 4/40*　　　(2018.01)

(52) U.S. Cl.
　　CPC ........... *H04B 7/088* (2013.01); *H04B 17/318* (2015.01); *H04B 17/382* (2015.01); *H04L 1/1812* (2013.01); *H04L 5/0055* (2013.01); *H04W 4/40* (2018.02)

(56) References Cited

U.S. PATENT DOCUMENTS

| | | | | |
|---|---|---|---|---|
| 2020/0351975 | A1* | 11/2020 | Tseng | H04W 76/19 |
| 2020/0359366 | A1* | 11/2020 | Kim | H04B 7/0695 |
| 2021/0105055 | A1* | 4/2021 | Chae | H04L 5/0091 |
| 2021/0314917 | A1* | 10/2021 | Lee | H04W 72/02 |
| 2022/0007403 | A1* | 1/2022 | Li | H04L 1/08 |
| 2022/0286184 | A1* | 9/2022 | Li | H04L 5/0051 |
| 2022/0394722 | A1* | 12/2022 | Hwang | H04W 72/542 |
| 2022/0399917 | A1* | 12/2022 | Shin | H04B 7/088 |
| 2022/0408294 | A1* | 12/2022 | Lee | H04W 76/14 |

FOREIGN PATENT DOCUMENTS

| | | |
|---|---|---|
| KR | 10-2019-0035633 A | 4/2019 |
| KR | 20200091274 A | 7/2020 |
| WO | 2019036578 A1 | 2/2019 |
| WO | 2019/128418 A1 | 7/2019 |

OTHER PUBLICATIONS

TCL Communication, "Physical Layer Procedures for Sidelink", R1-1908279, 3GPP TSG RAN WG1 Meeting #98, Prague, Czech Republic, Aug. 26-30, 2019, 14 pages.
NTT Docomo, Inc., "Sidelink physical layer procedure for NR V2X", R1-1909190, 3GPP TSG RAN WG1 #98, Prague, CZ, Aug. 26-30, 2019, 13 pages.
Huawei , "Sidelink physical layer procedures for NR V2X", R1-1900023, 3GPP TSG RAN WG1 Ad-Hoc Meeting 1901, Taipei, Jan. 21-25, 2019, 13 pages.
ZTE , "Discussion on PHY procedures for NR V2X", R1-1900775, 3GPP TSG RAN WG1 Ad-Hoc Meeting 1901, Taipei, Jan. 21-25, 2019, 7 pages.
Apple Inc., "Remaining Issues on Multi-beam operation", 3GPP TSG-RAN WG1 Meeting #98bis, Oct. 14-20, 2019, R1-1910969, 14 pages.
Futurewei, "Discussion on scope of NR V2X Rel-16 Wi", 3GPP TSG RAN Meeting #85, Sep. 16-20, 2019, RP-191868, 5 pages.
Samsung, "On Sidelink CSI", 3GPP TSG RAN WG1 #96bis, Apr. 8-12, 2019, R1-1904434, 5 pages.
Supplementary European Search Report dated Nov. 2, 2022 in connection with European Patent Application No. 20 89 0722, 11 pages.
Notice of Preliminary Rejection issued Sep. 10, 2024, in connection with Korean Patent Application No. KR10-2019-0151750, 15 pages.
3GPP TR 38.885 V2.0.0 (Mar. 2019) Technical Report, 3rd Generation Partnership Project; Technical Specification Group Radio Access Network; NR; Study on Vehicle-to-Everything (Release 16), Mar. 2019, 122 pages.
Ericsson, "On PHY procedures to support unicast and groupcast on NR sidelink," R1901212, 3GPP TSG-RAN WG1 Meeting # ah-1901, Taipei, Taiwan, Jan. 21-25, 2019, 11 pages.
3GPP TS 38.214 V15.7.0 (Sep. 2019) Technical Specification, 3rd Generation Partnership Project; Technical Specification Group Radio Access Network; NR; Physical layer procedures for data (Release 15), Sep. 2019, 106 pages.
Communication pursuant to Article 94(3) EPC dated Mar. 18, 2025, in connection with European Patent Application No. 20890722.0, 5 pages.
Notice of Preliminary Rejection issued May 15, 2025, in connection with Korean Patent Application No. 10-2019-0151750, 16 pages.
Ericsson, "Details on CSIT acquisition for SL unicast," R1-1901221 (Revision of R1 18 13643), 3GPP TSG RAN WG 1 Meeting ah 1901, Taipei, Taiwan, Jan. 21-25, 2019, 6 pages.

* cited by examiner

APPARATUS AND METHOD FOR SIDELINK BEAM OPERATION IN WIRELESS COMMUNICATION SYSTEM

CROSS-REFERENCE TO RELATED APPLICATIONS

This application is a 371 of International Application No. PCT/KR2020/016127, filed Nov. 17, 2020, which claims priority to Korean Patent Application No. 10-2019-0151750, filed Nov. 22, 2019, the disclosures of which are herein incorporated by reference in their entirety.

BACKGROUND

1. Field

The disclosure relates generally to a wireless communication system and, more particularly, to an apparatus and a method for a side link beam operation in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "Beyond 4G Network" communication system or a "Post Long Term Evolution (Post LTE)" system.

The 5G communication system is considered to be implemented in ultrahigh frequency (mmWave) bands (e.g., 60 GHz bands) so as to accomplish higher data rates. To decrease the propagation loss and increase the transmission distance of the radio waves in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, technical development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying and quadrature amplitude modulation (FQAM) and sliding window superposition coding (SWSC) as an advanced coding modulation (ACM) scheme, and filter bank multi carrier (FBMC), non-orthogonal multiple access (NOMA), and sparse code multiple access (SCMA) as an advanced access technology have also been developed.

SUMMARY

Based on the above discussion, the disclosure provides an apparatus and a method for a side link beam operation in a wireless communication system.

According to various embodiments of the disclosure, a method for operating a first UE in a wireless communication system is provided. The method includes establishing a connection with a second UE, periodically transmitting a sidelink channel state information reference signal (SL CSI-RS) to the second UE, receiving, from the second UE, a response message including preferred beam information based on the SL CSI-RS, transmitting a signal to the second UE by using a beam formed based on the response message, and receiving acknowledgement/not-acknowledgement (ACK/NACK) information for the signal from the second UE.

According to various embodiments of the disclosure, a first UE in a wireless communication system is provided. The first UE includes: a transceiver; and at least one processor, wherein the at least one processor is configured to establish a connection with a second UE, periodically transmit a sidelink channel state information reference signal (SL CSI-RS) to the second UE, receive, from the second UE, preferred beam information based on the SL CSI-RS, transmit a signal to the second UE by using a beam formed based on the beam information, and receive acknowledgement/not-acknowledgement (ACK/NACK) information for the signal from the second UE.

An apparatus and a method according to various embodiments of the disclosure may provide an apparatus and a method for a side link beam operation in a wireless communication system.

Advantageous effects obtainable from the disclosure may not be limited to the above-mentioned effects, and other effects which are not mentioned may be clearly understood, through the following descriptions, by those skilled in the art to which the disclosure pertains.

DETAILED DESCRIPTION

Figure 1A:
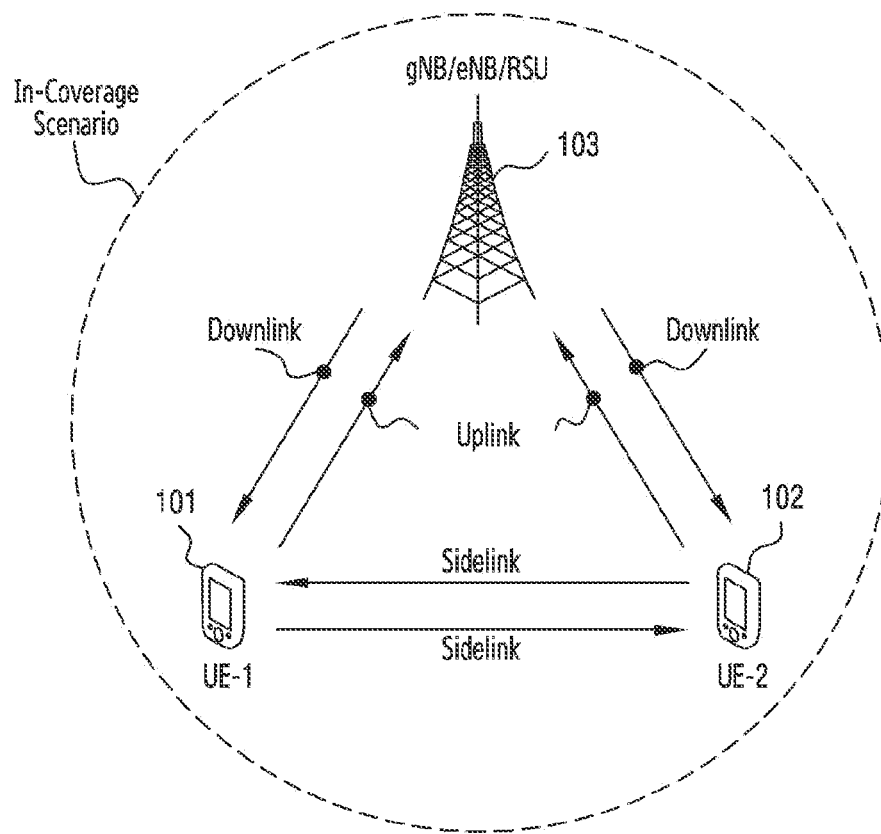
FIG. 1A illustrates an example of a case in which all V2X UEs are located within the coverage of a base station (in-coverage, IC) in a wireless communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to a wireless mobile communication system. Specifically, the disclosure relates to a method and an apparatus for performing beam management in a process in which a vehicle terminal supporting vehicle-to-everything (hereinafter, referred to as V2X) communication transmits or receives information to or from another vehicle terminal and a pedestrian portable terminal through a sidelink.

In the following description, terms referring to signals, terms referring to channels, terms referring to control information, terms referring to network entities, terms referring to elements of a device, and the like are illustrative words for the convenience of explanation. Accordingly, the disclosure is not limited to the terms described below, and other terms having equivalent technical meanings may be used.

In addition, although the disclosure will be described using terms used in some communication standards (e.g., 3rd-generation partnership project (3GPP)), this in only an example for the convenience of explanation. Various embodiments of the disclosure may be applied to other communication systems through simple modification.

The disclosure relates to a wireless mobile communication system, and to a method and apparatus for performing beam management in a process in which a vehicle terminal supporting V2X exchanges information with another vehicle terminal and a portable pedestrian terminal through a sidelink.

When a communication system operates at a high frequency, path loss occurs, and thus coverage limitation occurs. Therefore, there is a need to overcome this problem through beam-forming. However, when considering the characteristic that the vehicle terminal moves quickly in the sidelink, it may be difficult to perform beam management.

Various embodiments of the disclosure propose a method of performing beam management in consideration of a communication environment in a sidelink. Various embodiments of the disclosure propose operations of a terminal and a base station in a sidelink.

According to various embodiments of the disclosure, coverage can be improved by proposing a method for performing beam management when sidelink communication operates at a high frequency.

In order to meet growing demand for wireless data traffic after commercialization of 4G communication systems, efforts are underway to develop improved 5G communication system (new radio (NR)). In order to achieve a high data rate, the 5G communication system is designed to use resources in the very high frequency (mmWave) band (e.g., the 28 GHz frequency band). In order to mitigate the path loss of radio waves and increase the propagation distance of radio waves in the ultra-high frequency band, in the 5G communication system, beamforning, massive multiple-input multiple-output (massive MIMO), and full-dimensional multiple-input multiple-output (full dimensional MIMO, FD-MIMO), array antenna, analog beam-forming, and large scale antenna technologies are being discussed. In addition, unlike LTE, the 5G communication system supports various subcarrier spacings such as 15 kHz, 30 kHz, 60 kHz, and 120 kHz, and a physical control channel uses polar coding. A physical data channel uses a low density parity check (LDPC). In addition, as a waveform for uplink transmission, not only discrete Fourier transform spread orthogonal frequency division multiplex (DFT-S-OFDM) but also cyclic prefix based orthogonal frequency division multiplex (CP-OFDM) are used. In LTE, hybrid automatic repeat request (HARQ) retransmission in a transport block (TB) unit is supported, whereas 5G may additionally support code block group (CBG)-based HARQ retransmission in which a plurality of code blocks (CBs) are bundled.

In addition, in the 5G communication system, there are developments underway for system network improvement based on evolved small cells, advanced small cells, cloud radio access networks (RANs), ultra-dense networks, device-to-device (D2D) communication, wireless backhaul, vehicle to everything network (V2X network), cooperative communication, coordinated multi-points (CoMP), reception interference cancellation, and the like.

Meanwhile, the Internet, which is a human centered connectivity network where humans generate and consume information, is now evolving into the Internet of Things (IoT) where distributed entities, such as things, exchange and process information. The Internet of everything (IoE), which is a combination of IoT technology and big data processing technology through connection with a cloud server, has emerged. As technology elements, such as sensing technology, wired/wireless communication and network infrastructure, service interface technology, and security technology have been demanded for IoT implementation, recently there has been research into a sensor network, machine-to-machine (M2M) communication, machine-type communication (MTC), and the like. Such an IoT environment may provide intelligent Internet technology (IT) services that create new values for human life by collecting and analyzing data generated among connected things. The IoT may be applied to a variety of fields including smart homes, smart buildings, smart cities, smart cars or connected cars, smart grids, health care, smart appliances, and advanced medical services through convergence and combination between existing information technology (IT) and various industrial applications.

In addition, various attempts have been made to apply the 5G communication system to IoT networks. For example, technologies such as a sensor network, machine-to-machine (M2M) communication, and machine-type communication (MTC) may be implemented by beamforming, MIMO, and array antennas schemes which are 5G communication technologies. Application of a cloud radio access network (cloud RAN) as the above-described big data processing technology may also be considered to be an example of convergence between the 5G technology and the IoT technology. As described above, a plurality of services may be provided to a user in a communication system, and in order to provide the plurality of services to the user, a method of providing each service in the same time duration according to the characteristics of each service and an apparatus using the same are needed. Various services provided by the 5G communication system are being researched, and one thereof is a service that satisfies requirements of low latency and high reliability.

In a case of vehicle communication, in an NR V2X system, unicast communication, groupcast communication, multicast communication, and broadcast communication are supported between terminals. Further, NR V2X aims at providing more evolved service, such as platooning, advanced driving, extended sensor, and remote driving, unlike LTE V2X aiming at transmitting and receiving basic safety information required for driving of vehicles. Specifically, NR V2X is also supported in the high-frequency region. In general, when a communication system operates at a high frequency, pathloss occurs, thereby limiting coverage. Therefore, there is a need to overcome this problem through beamforming.

However, when considering the characteristics of the vehicle terminal moving rapidly in the sidelink, it may be difficult to perform beam management. Specifically, in a case of a Uu interface between a base station and a terminal, beam management between a base station and a terminal is supported in a state in which the base station is fixed, but in a case of sidelink, since two vehicle terminals performing communication can move simultaneously, the beam management can be more difficult. In addition, since the vehicle terminal can move at a high speed, it is necessary to quickly determine the beamforming in the initial stage. In other words, as the determination as to beamforming is delayed, the positions of two vehicle terminals may change and the possibility in which the formed beam is no longer a valid beam may increase. In addition, beam tracking needs to be quickly and continuously performed due to the narrow beam as well as the rapidly changing positions of the two vehicles. In addition, when beam management is wrong, a procedure for beam recovery may be required. Therefore, the operation of the terminal and the base station to solve this problem should be defined. However, there is no discussion related to the above problem. Accordingly, various embodiments of the disclosure propose a beam management method suitable for the sidelink transmission scenario being considered.

Various embodiments of the disclosure are proposed to support the above-described scenario. In particular, the objective of various embodiments of the disclosure is to provide a method and apparatus for performing beam management in consideration of a characteristic of a vehicle terminal moving rapidly in a sidelink.

FIG. 1A to FIG. 1D illustrate a wireless communication system according to various embodiments of the disclosure.

FIG. 1A illustrates an example of a case in which all V2X UEs are located within the coverage of a base station (in-coverage (IC)) in a wireless communication system according to various embodiments of the disclosure.

Referring to FIG. 1A, all V2X UEs UE-1 101 and UE-2 102 are located with the coverage of a base station 103 (in-coverage (IC)).

All V2X UEs UE-1 101 and UE-2 102 may receive data and control information via a downlink (DL) from the base station 103 or may transmit data and control information via an uplink (UL) to the base station 103. According to an embodiment, the data and the control information may be data and control information for V2X communication. According to an embodiment, the data and the control information may be data and control information for general cellular communication. According to an embodiment, the V2X UEs 101 and 102 may transmit/receive data and control information for V2X communication through a sidelink (SL).

Figure 1B:
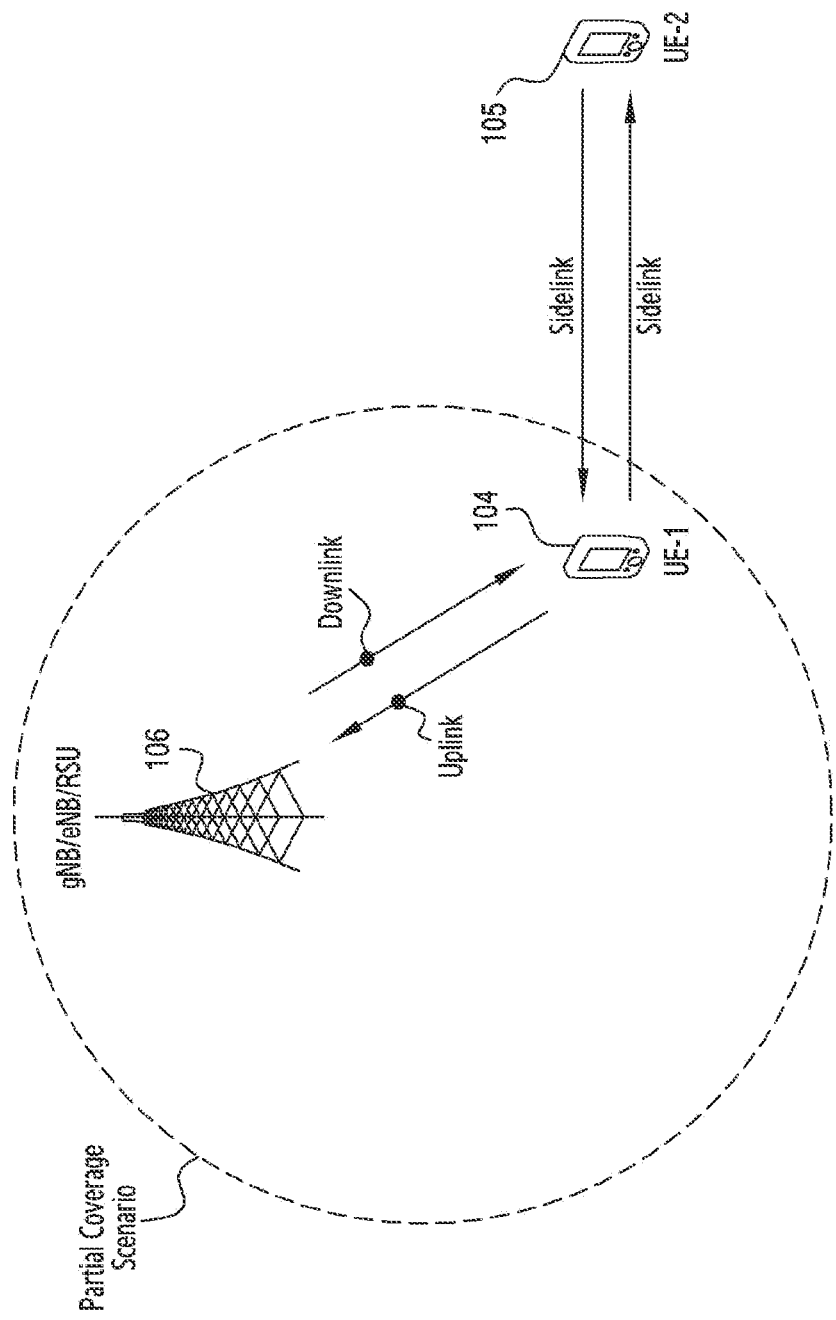
FIG. 1B illustrates an example of a case in which a part of V2X UEs is located within the coverage of a base station in the wireless communication system, and the other part of the V2X UEs is located outside the coverage of a base station according to various embodiments of the disclosure.

FIG. 1B illustrates an example of a case in which a part of V2X UEs is located within the coverage of a base station, and the other part of the V2X UEs is located outside the coverage of the base station in a wireless communication system according to various embodiments of the disclosure.

Referring to FIG. 1B, an example in which UE-1 104 among V2X UEs is located within the coverage of a base station 106 (in-coverage (IC)) and UE-2 105 is located outside the coverage of the base station 106 (out-of-coverage (OOC)) is shown. That, FIG. 1B illustrates an example of a partial coverage in which UE-2 105 among the V2X UEs is located outside the coverage of the base station 106 (partial coverage (PC)).

The V2X UE (UE-1) 104 located in the coverage of the base station 106 may receive data and control information from the base station 106 via a downlink, or may transmit data and control information via an uplink to the base station 106. V2X UE (UE-2) 105 located outside the coverage of the base station 106 may not receive data and control information via the downlink from the base station 106, and may not transmit data and control information via the uplink to the base station 106. V2X UE (UE-2) 105 may transmit/receive data and control information for V2X communication to/from the V2X UE (UE-1) 104 through a sidelink.

Figure 1C:
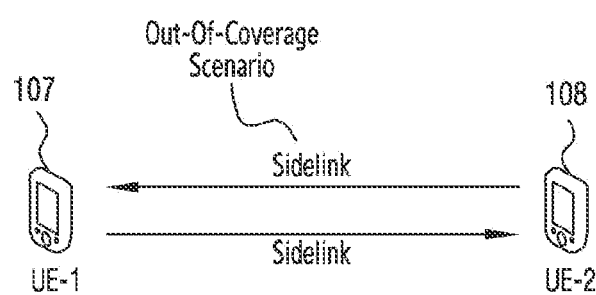
FIG. 1C illustrates an example of a case in which all V2X UEs are located outside the coverage of a base station (out-of-coverage, OOC) in a wireless communication system according to various embodiments of the disclosure.

FIG. 1C illustrates an example of a case in which all V2X UEs are located outside the coverage of a base station (out-of-coverage (OOC)) in a wireless communication system according to various embodiments of the disclosure.

Referring to FIG. 1C, V2X UEs (UE-1) 107 and (UE-2) 108 may not receive data and control information from the base station via the downlink and may not transmit data and control information via the uplink to the base station. V2X UEs (UE-1) 107 and (UE-2) 108 may transmit/receive data and control information for V2X communication via the sidelink (SL).

Figure 1D:
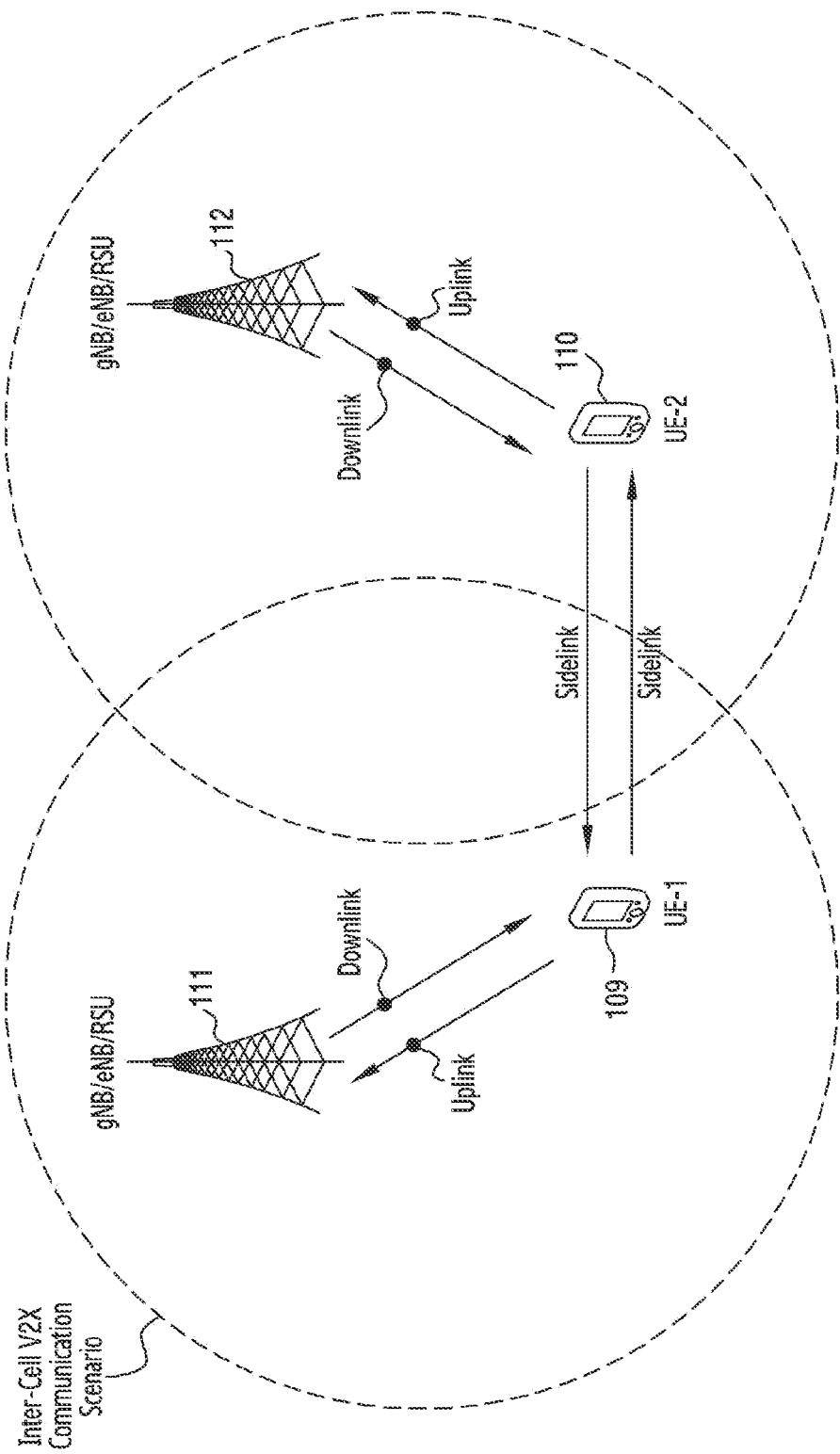
FIG. 1D illustrates an example of a case of performing V2X communication between V2X UEs located in different cells in a wireless communication system according to various embodiments of the disclosure (inter-cell V2X communication)

FIG. 1D illustrate an example of a case of performing V2X communication between V2X UEs located in different cells in a wireless communication system according to various embodiments of the disclosure (inter-cell V2X communication).

Referring to FIG. 1D, a case (a RRC connected state) in which V2X UEs (UE-1) 109 and (UE-2) 110 are connected to different base stations 111 and 112 or a case (an RRC disconnected state, i.e., an RRC idle state) in which the V2X UEs (UE-1) 109 and (UE-2) 110 are camped. Here, the V2X UE (UE-1) 109 may be a V2X transmitting UE, and the V2X UE (UE-2) 110 may be a V2X receiving UE. Alternatively, the V2X UE (UE-1) 109 may be a V2X receiving UE, and the V2X UE (UE-2) 110 may be a V2X transmitting UE. The V2X UE (UE-1) 109 may receive a system information block (SIB) from the base station 111 to which the UE-1 109 itself is connected (or on which the UE-1 itself is camping), and the V2X UE (UE-2) 110 may receive a SIB from another base station 112 to which the UE-2 itself is connected (or on which the UE-2 itself is camping). Here, as the SIB, an existing SIB may be used or an SIB defined separately for V2X may be used. Further, Information of the SIB, which is received by the V2X UE (UE-1) 109, and information of the SIB, which is received by the V2X UE (UE-2) 110, may be different from each other. Therefore, in order to perform V2X communication between the UEs (UE-1) 109 and (UE-2) 110 located in different cells 111 and 112, a method of interpreting SIB information transmitted from different cells 111 and 112 through unification of information or signaling the information thereto may be additionally required.

In FIG. 1A to FIG. 1D, for the convenience of explanation, a V2X system including V2X UEs (UE-1 and UE-2) is described as an example. However, a V2X system is not limited thereto, and communication between more V2X UEs may be established. An interface (uplink and downlink) between the base station and the V2X UEs may be referred to as a Uu interface, and the sidelink between the V2X UEs may be referred to as a PC5 interface. Therefore, in the disclosure, such terms may be interchangeably used.

Meanwhile, in the disclosure, a UE may include a vehicle supporting vehicular-to-vehicular (V2V) communication, a vehicle or a handset (e.g., a smartphone) of a pedestrian, which supports vehicular-to-pedestrian (V2P) communication, a vehicle supporting vehicular-to-network (V2N) communication, or a vehicle supporting vehicular-to-infrastructure (V2I) communication.

In addition, in the disclosure, a UE may include a roadside unit (RSU) equipped with a UE function, an RSU equipped with a base station function, or an RSU equipped with a part of the base station function and a part of the UE function.

In addition, according to various embodiments of the disclosure, a base station may be a base station supporting both V2X communication and general cellular communication, or may be a base station supporting only V2X communication. Here, the base station may be a 5G base station (gNB), a 4G base station (eNB), or an RSU. Therefore, in various embodiments of the disclosure, the base station may be referred to as an RSU.

Figure 2A:
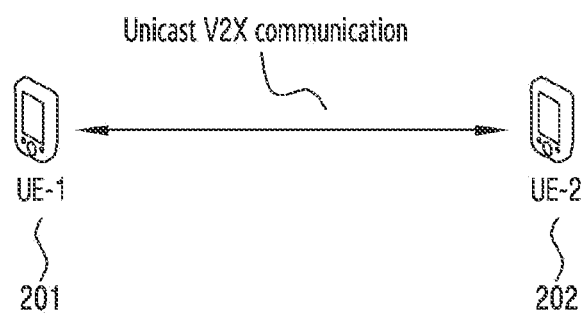
FIG. 2A illustrates a sidelink V2X communication method through unicast in a wireless communication system according to various embodiments of the disclosure.
Figure 2B:
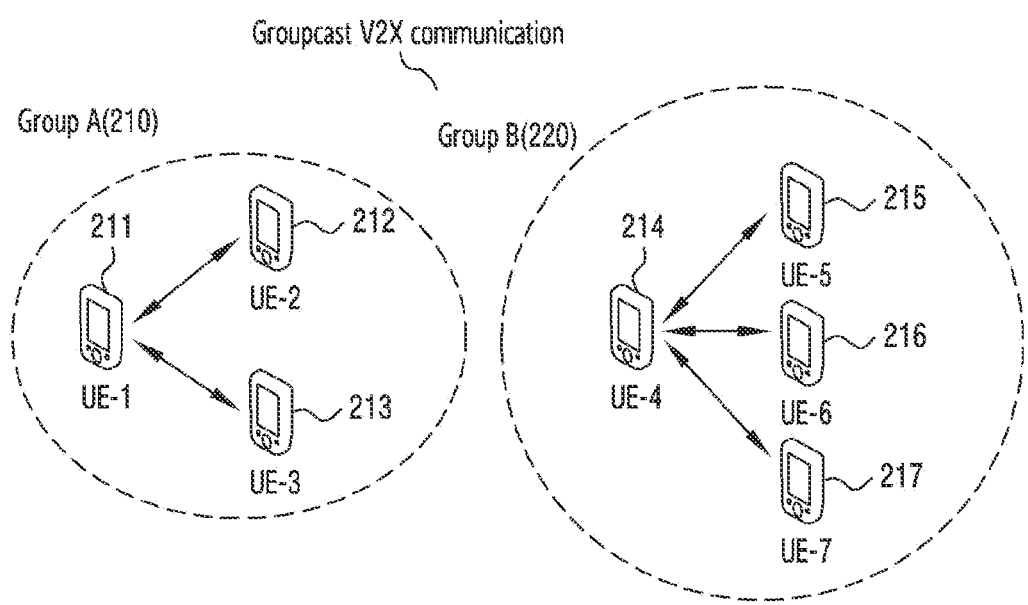
FIG. 2B illustrates a sidelink V2X communication method through groupcast or multicast in a wireless communication system according to various embodiments of the disclosure.

FIG. 2A to 2B illustrate a V2X communication method performed through a sidelink in a wireless communication system according to various embodiments of the disclosure.

FIG. 2A illustrates a sidelink V2X communication method through unicast in a wireless communication system according to various embodiments of the disclosure.

Referring to FIG. 2A, UE-1 (e.g., a TX UE 201) and UE-2 (e.g., an RX UE 202) may perform one-to-one communication, and this may be referred to as unicast communication.

FIG. 2B illustrates a sidelink V2X communication method through group cast or multi-cast in a wireless communication system according to various embodiments of the disclosure.

Referring to FIG. 2B, a TX UE 211 and RX UEs 212 and 213 may perform one-to-many communication, and this may be called groupcast or multicast.

In FIG. 2B, UE-1 211, UE-2 212, and UE-3 213 may form one group (group A 210) to perform groupcast communication, and UE-4 214, UE-5 215, UE-6 216, and UE-7 217 form another group (group B 220) to perform groupcast communication. Each of the UEs 211, 212, 213, 214, 215, 216, and 217 may perform groupcast communication only within a group 210 or 220 to which each UE belongs, and may perform unicast, groupcast, or broadcast communication between different groups. FIG. 2B illustrates that two groups (group A 210 and group B 220) are formed, but various embodiments of the disclosure are not limited thereto.

Although not illustrated in FIG. 2A or FIG. 2B, V2X UEs may perform broadcast communication. The broadcast communication refers to a case in which all V2X UEs receive data and control information transmitted through a sidelink by a V2X transmitting UE.

According to various embodiments of the disclosure, in FIG. 2B, if it is assumed that UE-1 211 is a transmitting UE for broadcast, all UEs (UE-2 212, UE-3 213, UE-4 214, UE-5 215, UE-6 216, and UE-7 217) may receive data and control information transmitted by the UE-1 211.

In NR V2X, unlike in LTE V2X, support of a transmission type in which a vehicle UE transmits data to only one specific node via unicast and support of a transmission type in which data is transmitted to multiple specific nodes via groupcast may be considered. For example, when considering a service scenario, such as platooning, which is a technology of moving two or more vehicles in a cluster by connecting the two or more vehicles to one network, such unicast and groupcast technologies may be useful. Specifically, unicast communication may be required for the purpose of controlling one specific node by a leader node of a group connected by platooning, and groupcast communication may be required for the purpose of simultaneously controlling a group including multiple specific nodes.

Figure 3:
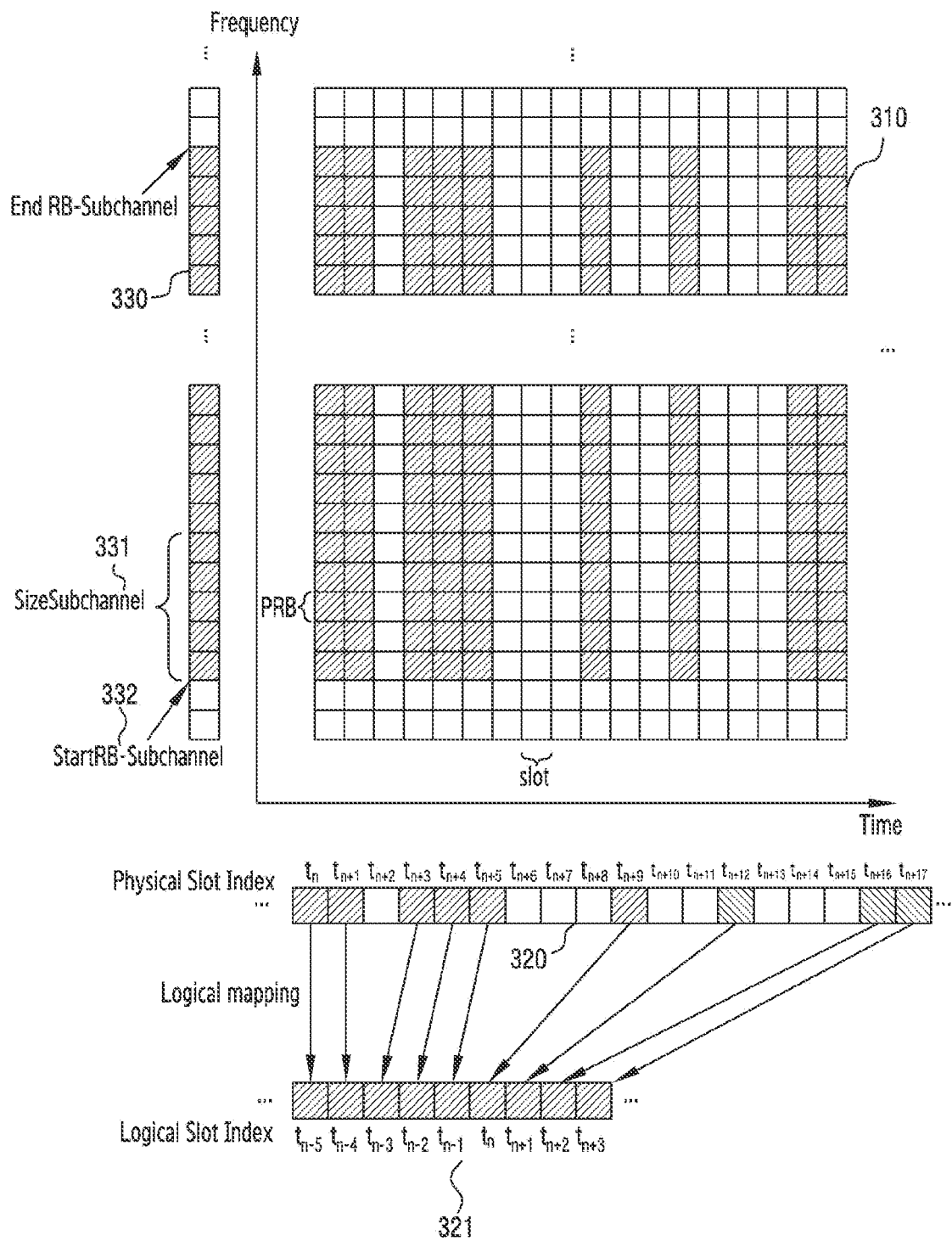
FIG. 3 illustrates a resource pool defined as a set of resources on time and frequency used for transmission and reception through a sidelink in a wireless communication system according to various embodiments of the disclosure.

FIG. 3 illustrates a resource pool defined as a set of resources on time and frequency used for transmission and reception through a sidelink in a wireless communication system according to various embodiments of the disclosure.

In the resource pool, a resource allocation unit (resource granularity) on a time axis may be a slot. In addition, the resource allocation unit on a frequency axis may be a sub-channel configured by one or more physical resource blocks (PRBs).

When the resource pool is allocated in a time and a frequency domain (indicated by reference numeral 310), the colored area indicates an area configured as the resource pool in the time and frequency domain. In various embodiments of the disclosure, an example of a case in which the resource pool is non-contiguously allocated on the time axis is described, but the resource pool may be continuously allocated on the time axis. Further, in various embodiments of the disclosure, a case in which the resource pool is continuously allocated on the frequency axis is described as an example. However, a method in which the resource pool is non-contiguously allocated on the frequency axis is not excluded.

FIG. 3 illustrates a case in which the resource pool is non-contiguously allocated on the time axis (indicated by reference numeral 320). In addition, FIG. 3 illustrates a case in which a unit (granularity) of resource allocation on the time axis is configured by slots.

Specifically, one slot configured by plurality of OFDM symbols may be a basic unit for resource allocation on the time axis. Here, all OFDM symbols configuring the slot may be used for sidelink transmission, and some OFDM symbols configuring the slot may be used for sidelink transmission. For example, a part of the slot may be used as a downlink/uplink used as a Uu interface between a base station and a UE.

Referring to FIG. 3, colored slots indicate slots included in the resource pool in a time domain, and the slots assigned to the resource pool may be (pre-)configured with resource pool information on the time axis. For example, the resource pool information on the time axis may be indicated as a bitmap through a SIB.

Referring to FIG. 3, a physical slot 320 belonging to a non-contiguous resource pool on a time axis may be mapped to a logical slot 321.

FIG. 3 shows a case in which a resource pool is continuously allocated on a frequency domain (indicated by reference numeral 330).

In the frequency axis, resource allocation may be performed in units of subchannels 331. The subchannel 331 may be defined as a resource allocation unit on the frequency domain including one or more resource blocks (RBs). That is, the subchannel 331 may be defined as an integer multiple of RBs.

Referring to FIG. 3, a subchannel 3-31 may be configured by 5 successive PRBs, and the size of the subchannel (sizeSubchannel) may be the magnitude of 5 successive PRBs. However, FIG. 3 is only an example of various embodiments of the disclosure. The size of the subchannel may be differently configured, and one subchannel is generally configured as consecutive PRBs, but is not necessarily configured as consecutive PRBs. The subchannel 331 may be a basic unit of resource allocation for a PSSCH.

A start RB-subchannel (startRB-Subchannel) 332 may indicate a start position of the subchannel 331 on a frequency in the resource pool. In a case where resource allocation is performed in units of subchannels 331 on the frequency axis, resource allocation on the frequency may be performed through the index of startRB-Subchannel 332 of the subchannel 331, information on the number of RBs configuring the subchannel 331 (sizeSubchannel), and configuration information of the total number of subchannels 331 (numSubchannel). Here, information on the startRB-Subchannel, 332, the size of the subchannel (sizeSubchannel), and the total number of subchannels (numSubchannel) may be (pre-)configured with resource pool information on the frequency. For example, the frequency resource pool information may be configured through a SIB and indicated.

Figure 4:
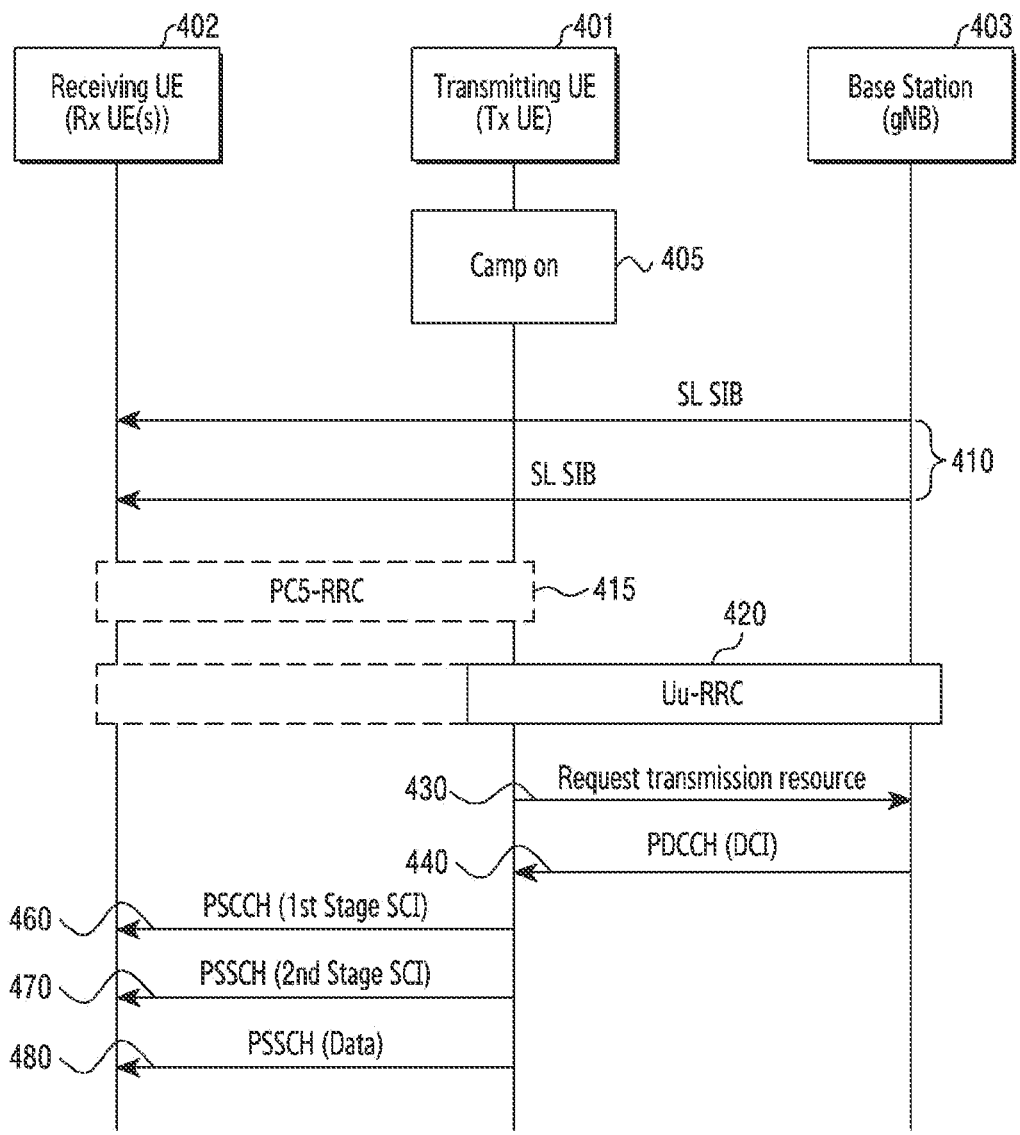
FIG. 4 illustrates a method for allocating a transmission resource in a sidelink by a base station in a wireless communication system according to various embodiments of the disclosure.

FIG. 4 illustrates a method for allocating a transmission resource in a sidelink by a base station in a wireless communication system according to various embodiments of the disclosure.

Hereinafter, a method in which a base station (gNB) 403 allocates transmission resources in a sidelink is referred to as mode 1. Mode 1 may be a scheduled resource allocation (scheduled resource allocation). Mode 1 may indicate a method in which the gNB 403 allocates resources used for sidelink transmission to radio resource control (RRC) connected UEs 401 and 402 through a dedicated scheduling method. The method of mode 1 may be effective for interference management and resource pool management because the gNB 403 may manage sidelink resources.

Referring to FIG. 4, a transmitting UE (Tx UE) 401 which camps on (indicated by reference numeral 405) and a receiving UE(s) (Rx UE(s)) 402 may receive a sidelink system information block (SL-SIB) from the base station (gNB) 403 (indicated by reference numeral 410). Here, the Rx UE(s) 402 represent a UE receiving data transmitted by the Tx UE 401. According to various embodiments of the disclosure, SL-SIB information may include sidelink resource pool information for sidelink transmission/reception, parameter configuration information for a sensing operation, information for configuring sidelink synchronization, carrier information for sidelink transmission and reception in different frequencies, or the like.

When data traffic for V2X is generated in the Tx UE 401, the Tx UE 401 may be RRC-connected to the gNB 403 (indicated by reference numeral 420). Here, the RRC connection between the UE and the base station may be referred to as Uu-RRC. The Uu-RRC connection process 420 may be performed before generation of data traffic of the Tx UE 401. Further, in mode 1, the transmitting UE may perform transmission to the receiving UE through a sidelink in a state in which the Uu-RRC connection process 420 between the gNB 403 and the Rx UE(s) 402 is established. On the other hand, in mode 1, the transmitting UE may perform transmission to the receiving UE through the sidelink even when the Uu-RRC connection process 420 between the gNB 403 and the Rx UE(s) 402 is not established.

The Tx UE 401 may request a transmission resource through which V2X communication with the Rx UE(s) 402 can be performed from the base station (indicated by reference numeral 430). In this case, the Tx UE 401 may request sidelink transmission resources from the gNB 403 by using a physical uplink control channel (PUCCH), an RRC message, or a medium access control (MAC) control element (CE). Meanwhile, the MAC CE may be, for example, a buffer status report (BSR) MAC CE of a new format (at least including an indicator indicating a buffer status report for V2X communication and information on the size of data buffered for D2D communication). Further, the Tx UE 401 may request sidelink resources through a scheduling request (SR) bit transmitted through the physical uplink control channel.

Next, the gNB 403 may allocate a V2X transmission resource to the transmitting UE 401. In this case, the base station may allocate transmission resources in a dynamic grant or configured grant method.

First, in a case of a dynamic grant method, the base station may allocate resources for transport block (TB) transmission through downlink control information (DCI). The sidelink scheduling information included in DCI may include parameters related to frequency allocation location information fields and transmission time points of initial transmission and retransmission. DCI for the dynamic grant method may be cyclic redundancy check (CRC) scrambled with sidelink V2X radio network temporary identifier (SL-V-RNTI) so as to indicate that it is a dynamic grant method.

Next, in a case of the configured grant (CG) method, the base station may periodically allocate resources for TB transmission by configuring a semi-persistent scheduling (SPS) interval through Uu-RRC. In this case, the base station may allocate resources for one TB through DCI. Sidelink scheduling information for one TB included in DCI may include parameters related to frequency allocation location information and transmission time points of initial transmission and retransmission resources. When resources are allocated in a configured grant method, the frequency allocation location and the transmission time point (occasion) of initial transmission and retransmission for one TB may be determined by the DCI, and the resource for the next TB may be repeated at SPS interval. DCI for the configured grant method may be CRC scrambled by SL-SPS-V-RNTI so as to indicate that it is a configured grant method. In addition, a configured grant (CG) method may be divided into a type1 CG and a type2 CG. In a case of type2 CG, it is possible to activate/deactivate a resource configured as a configured grant through DCI.

Accordingly, in a case of mode 1, the gNB 403 may instruct the Tx UE 401 to schedule for sidelink communication with the Rx UE(s) 402 by DCI transmission through a PDCCH (indicated by reference numeral 440).

In a case of broadcast transmission, the Tx UE 401 may broadcast first stage sidelink control information (1st stage SCI) to the Rx UE(s) 402 through a PSCCH without sidelink RRC configuration 415 (indicated by reference numeral 460). Further, the Tx UE 401 may broadcast data to the Rx UE(s) 402 through the PSSCH (indicated by reference numeral 480). In a case of broadcast transmission, second stage SCI (2nd stage SCI) transmission 470 through the PSSCH may not be performed.

Unlike this, in a case of unicast or groupcast transmission, the Tx UE 401 may establish the RRC connection with other UEs in one-to-one correspondence. Here, the RRC connection between UEs may be referred to as PC5-RRC 415 separately from Uu-RRC. In a case of groupcast, PC5-RRC 415 is individually connected between UEs in a group.

Although FIG. 4 illustrates that a connection of PC5-RRC 415 is established after the SL-SIB transmission 410, the connection may be performed any time before the SL-SIB transmission 410 or before the SCI transmission. If the RRC connection is needed between UEs, the PC5-RRC connection of the sidelink is performed, and the Tx UE 401 may transmit the 1st stage SCI to the receiving UEs 402 through the PSCCH in a unicast or groupcast manner (indicated by reference numeral 460). Here, groupcast transmission of the SCI may be interpreted as transmission of group SCI. Further, the Tx UE 401 may transmit the 2nd stage SCI to the Rx UE(s) 402 through a PSSCH in a unicast or groupcast manner (indicated by reference numeral 470). In this case, information related to resource allocation may be included in the 1st stage SCI. Further, control information other than that may be included in the 2nd stage SCI. In addition, the Tx UE 401 may transmit data to the Rx UE(s) 402 through a PSSCH in a unicast or groupcast manner (indicated by reference numeral 480).

Figure 5:
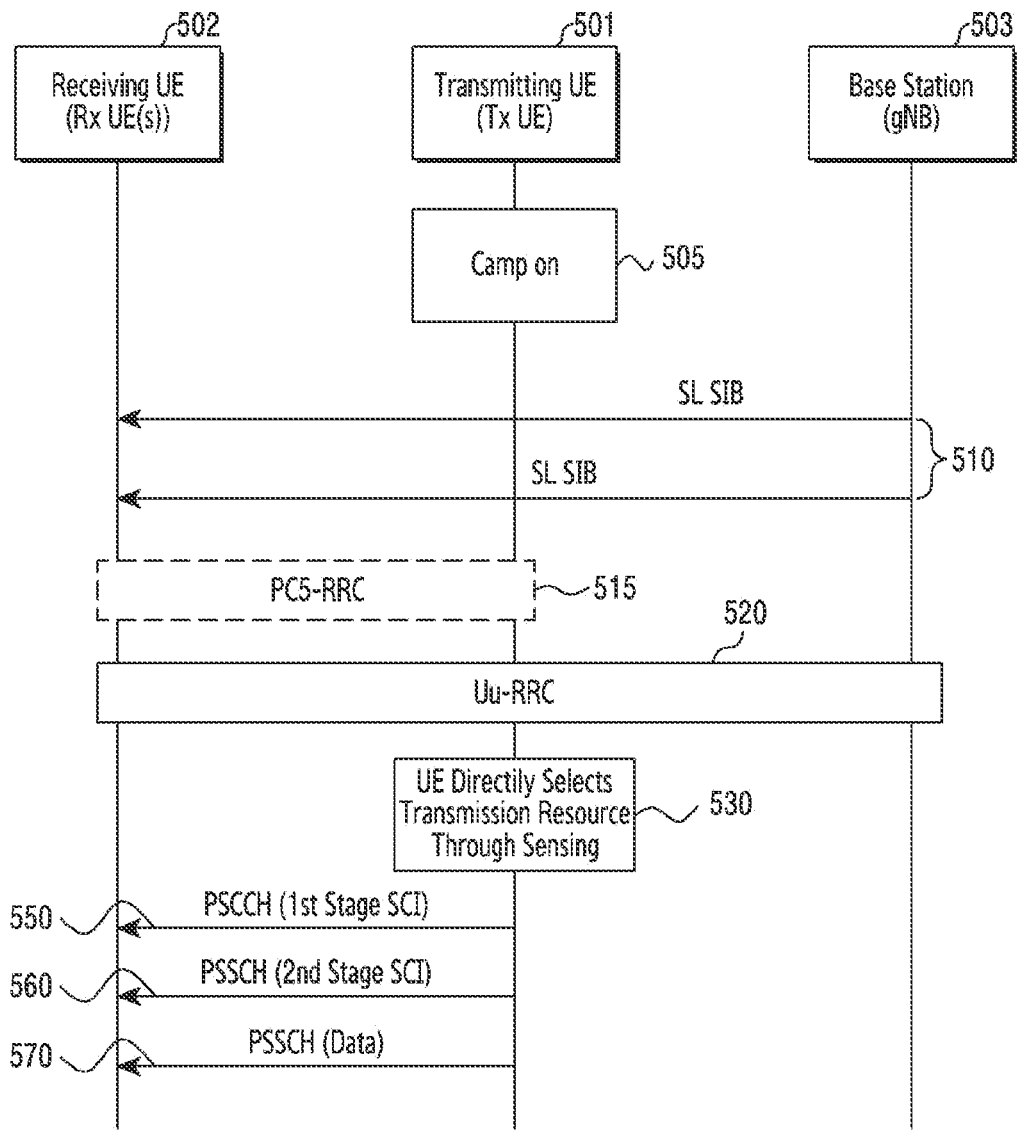
FIG. 5 illustrates a method for directly allocating a sidelink transmission resource through sensing by a sidelink UE in a wireless communication system according to various embodiments.

FIG. 5 illustrates a method in which a sidelink UE directly allocates transmission resources through sensing in a wireless communication system according to various embodiments.

Hereinafter, a method in which a sidelink UE directly allocates transmission resources through sensing is referred to as mode 2.

Mode 2 may be referred to as UE autonomous resource selection. In mode 2, a base station 503 may provide a sidelink transmission/reception resource pool for V2X through system information, and a transmitting UE (Tx UE) 501 may select transmission resources according to a predetermined rule. Unlike mode 1 in which the gNB directly involves in resource allocation, in mode 2 as shown in FIG. 5, the Tx UE 501 autonomously selects resources based on a resource pool pre-received through system information and transmits data.

Referring to FIG. 5, a transmitting UE (Tx UE) 501 which camps on (indicated by reference numeral 505) and a receiving UE (Rx UE(s)) 502 may receive an SL-SIB from the base station (gNB) 503 (indicated by reference numeral 510). Here, the Rx UE(s) 502 represents a UE receiving data transmitted by the Tx UE 501. SL-SIB information may include sidelink resource pool information for sidelink transmission/reception, parameter configuration information for a sensing operation, information for configuring sidelink synchronization, carrier information for sidelink transmission and reception in different frequencies, or the like.

A difference between the embodiment of FIG. 4 and the embodiment of FIG. 5 is that the operation of the embodiment of FIG. 4 is performed in a state in which the gNB 503 and the Tx UE 501 are RRC-connected, but the operation in the embodiment of FIG. 5 is performed even when the UE is in an idle mode 520 (in a state in which the UE is not RRC-connected). In addition, in the embodiment of FIG. 5, the Tx UE 501 may autonomously select transmission resources without direct involvement of the gNB 503 in resource allocation even in the RRC-connected state 520. Here, the RRC connection between the Tx UE 501 and the gNB 503 may be referred to as Uu-RRC 520. When data traffic for V2X is generated in the Tx UE 501, the Tx UE 501 may receive the configuration of a resource pool through system information received from the gNB 503, and may directly select time/frequency domain resources through sensing within the configured resource pool (indicated by reference numeral 530).

In a case of broadcast transmission, the Tx UE 501 may broadcast 1st stage SCI to the Rx UE(s) 502 through a PSCCH without sidelink RRC configuration 520 via broadcast (indicated by reference numeral 550). Further, the Tx UE 501 may broadcast data to the Rx UE(s) 502 through the PSSCH (indicated by reference numeral 560). In a case of broadcast transmission, transmission 470 of 2nd stage SCI through the PSSCH may not be performed.

Unlike this, in a case of unicast and groupcast transmission, the Tx UE 501 may establish the RRC connection with other UEs in one-to-one correspondence. Here, the RRC connection between UEs may be referred to as PC5-RRC separately from Uu-RRC. In a case of groupcast, PC5-RRC is individually connected between UEs in a group. Although FIG. 5 illustrates that the connection of PC5-RRC 515 is established after the SL-SIB transmission 510, the PC5-RRC connection may be performed any time before the SL-SIB transmission 510 or before the SCI transmission 550 according to various embodiments of the disclosure. If the RRC connection is needed between UEs, the PC5-RRC connection of the sidelink is performed (indicated by reference numeral 515), and the Tx UE 501 may transmit the 1st stage SCI to the Rx UE(s) 502 through the PSCCH in a unicast or groupcast manner (indicated by reference numeral 550). Here, groupcast transmission of the SCI may be interpreted as transmission of group SCI. Further, the Tx UE 501 may transmit the 2nd stage SCI to the Rx UE(s) 502 through a PSSCH in a unicast or groupcast manner (indicated by reference numeral 560). In this case, information related to resource allocation may be included in the 1st stage SCI, and control information other than that may be included in the 2nd stage SCI. In addition, the Tx UE 501 may transmit data to the Rx UE(s) 502 through the PSSCH in a unicast or groupcast manner (indicated by reference numeral 570).

Figure 6A:
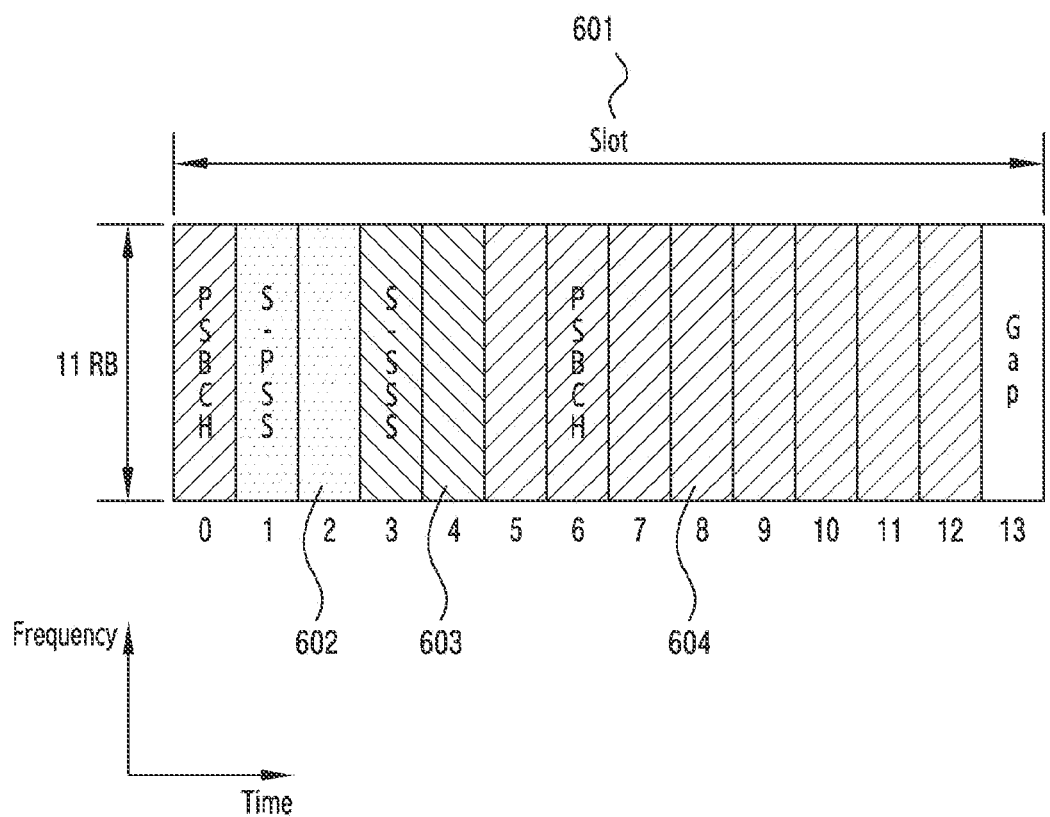
FIG. 6A illustrates mapping of S-PSS/S-SSS/PSBCH physical channels in a wireless communication system according to various embodiments of the disclosure.
Figure 6B:
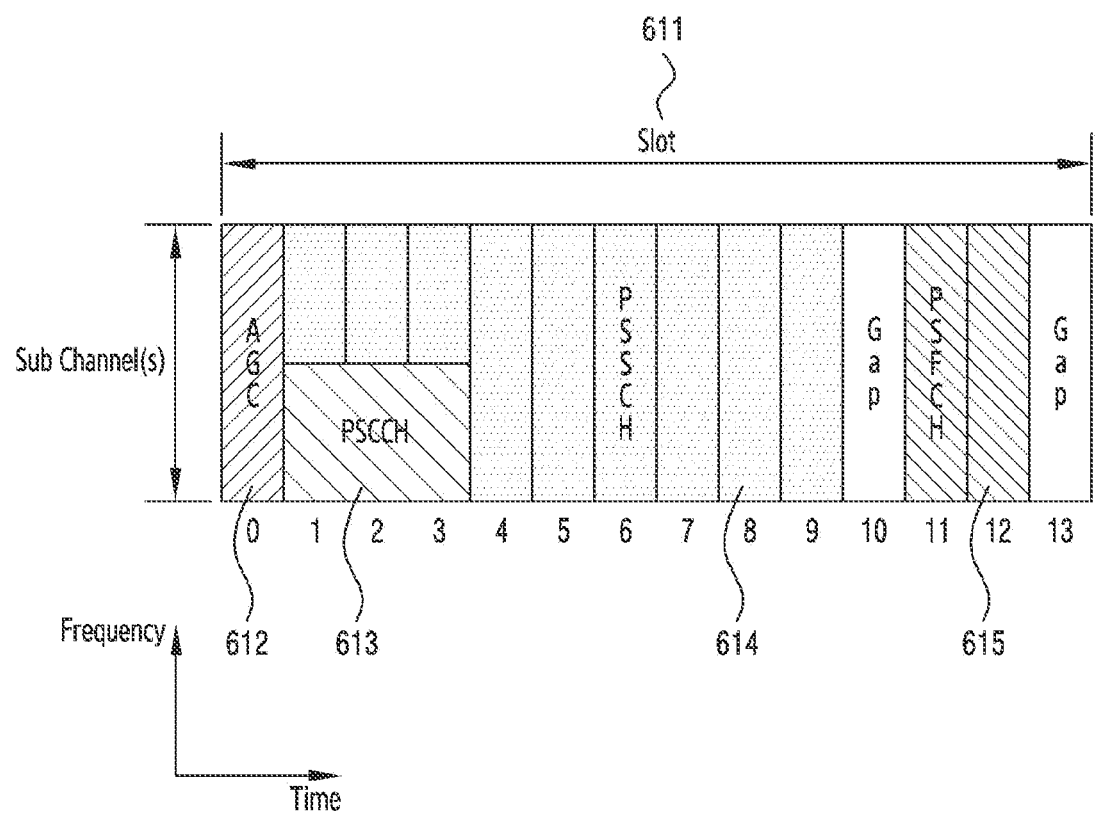
FIG. 6B illustrates mapping of PSCCH/PSSCH/PSFCH physical channels in a wireless communication system according to various embodiments of the disclosure.

FIGS. 6A to 6B illustrate structures of physical channels mapped to one slot in a sidelink in a wireless communication system according to various embodiments of the disclosure. In the embodiments of FIGS. 6A to 6B, a normal cyclic prefix (CP) is assumed.

FIG. 6A illustrates mapping of S-PSS/S-SSS/PSBCH physical channels in a wireless communication system according to various embodiments of the disclosure.

The corresponding channels of FIG. 6A may be collectively referred to as a sidelink synchronization signal block (S-SSB). The S-SSB is transmitted through 11 RBs in a frequency domain, and a location at which the S-SSB is transmitted may be (pre-)configured. In order to describe mapping of the S-SSB in a time domain, when referring to FIG. 6A, a transmitting UE transmits a PSBCH through the first symbol of a corresponding slot 601. When the receiving UE amplifies the power of a received signal in the corresponding symbol, automatic gain control (AGC) for adjusting the strength of amplification may be performed. The transmitting UE transmits a sidelink primary synchronization signal (S-PSS) through the second and third symbols of the corresponding slot 601 (indicated by reference numeral 602). In addition, the transmitting UE transmits a sidelink secondary synchronization signal (S-SSS) through the fourth and fifth symbols of the corresponding slot 601 (indicated by reference numeral 603). In addition, as shown in FIG. 6A, the PSBCH may be transmitted again through the symbols after the S-SSS (indicated by reference numeral 604). In addition, the last symbol of the corresponding slot 601 may secure an empty gap for a predetermined period of time.

FIG. 6B illustrates mapping of PSCCH/PSSCH/PSFCH physical channels in a wireless communication system according to various embodiments of the disclosure.

PSCCH/PSSCH/PSFCH may be allocated to one or more subchannels in a frequency domain. For details on sub-channel allocation, the description of FIG. 3 is referred to. In order to describe mapping of PSCCH/PSSCH/PSFCH in a time domain, when referring to FIG. 6B, one or more symbols before transmission of the PSCCH/PSSCH/PSFCH to a corresponding slot 611 by the UE may be used as a region 612 for AGC. When the corresponding symbol(s) are used for AGC, a method of repetitively transmitting signals of other channels through the corresponding symbol region may be considered. In this case, a part of a PSCCH symbol or a PSSCH symbol may be considered as a repeated signal of another channel.

On the other hand, a preamble signal may be transmitted to the AGC region. When the preamble signal is transmitted, the AGC execution time can be further shortened compared to a method of repeatedly transmitting signals of other channels. When the preamble signal is transmitted for AGC, a specific sequence of the preamble signal 612 may be used. In this case, a sequence such as PSSCH DMRS, PSCCH DMRS, and CSI-RS may be used as the preamble signal. In various embodiments of the disclosure, a sequence used as a preamble signal is not limited to the above-described example.

Further, referring to FIG. 6B, a PSCCH 613 including control information is transmitted through symbols in the beginning part of the slot 611, and data scheduled by the control information of the PSCCH 613 may be transmitted to a PSSCH 614. A part of sidelink control information (SCI) which is control information, for example, the 1st stage SCI may be mapped to the PSCCH 613 and transmitted. In addition to data information, another part of SCI, which is control information, for example, the 2nd stage SCI may be mapped to the PSSCH 614 and transmitted.

Further, referring to FIG. 6B, a physical sidelink feedback channel (PSFCH) 615, which is a physical channel for transmitting feedback information, is located in the last part of the slot. The PSFCH 615 may be configured by two symbols, and the first symbol of the PSFCH 615 may be used as an AGC. A predetermined time gap may be secured between the PSSCH 614 and the PSFCH 615 so that a UE that has transmitted and received the PSSCH 614 may prepare to transmit or receive the PSFCH 615. In addition, after transmission or reception of the PSFCH 615, an empty gap may be secured for a predetermined period of time.

The following embodiments are intended to propose a more specific method for performing beam management in a sidelink. In addition, the following embodiments relate to the operation of a receiving UE, a transmitting UE, and a base station according to the proposed method. Although the following embodiments are divided into operations necessary for beam management of the sidelink, a method in which one or more embodiments are combined may be used.

Embodiment 1 proposes a method for sweeping a beam during S-SSB transmission in a sidelink. Embodiment 2 proposes a method for initially and rapidly determining beamforming when transmission/reception between UEs is performed in a sidelink. Embodiment 3 proposes a method of introducing a periodic sidelink channel state information reference signal (SL CSI-RS) to perform rapid and continuous beam tracking in a sidelink. In addition, embodiment 3 proposes a method for periodically supporting sidelink channel state information (SL CSI) reporting including beam information. Embodiment 4 proposes a method of supporting beam tracking of a transmitting UE (Tx beam tracking) and beam tracking of a receiving UE (Rx beam tracking) in supporting beam tracking in a sidelink. Embodiment 5 proposes a method of supporting a beam indication in a sidelink. Embodiment 6 proposes a method in which a receiving UE reports beam-related information to a transmitting UE in a sidelink.

First Embodiment

The first embodiment proposes an operation in which a UE sweeps a beam during S-SSB transmission in a sidelink. In particular, since when a system operates at a high frequency, pathloss may occur and thus the coverage may be limited, it is necessary to improve the coverage of the S-SSB through beam management. In the embodiment, an operation of sweeping a beam refers to a method of transmitting a different beam by rotation for each transmission.

Figure 7A:
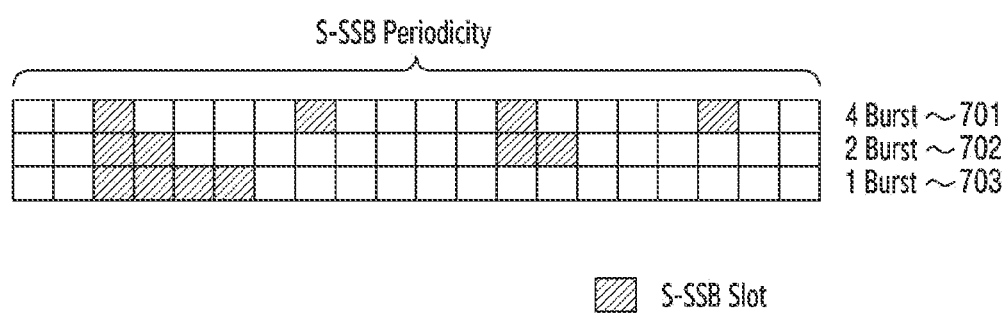
FIG. 7A illustrates a structure of an S-SSB burst within an S-SSB transmission periodicity in a wireless communication system according to various embodiments of the disclosure.
Figure 7B:
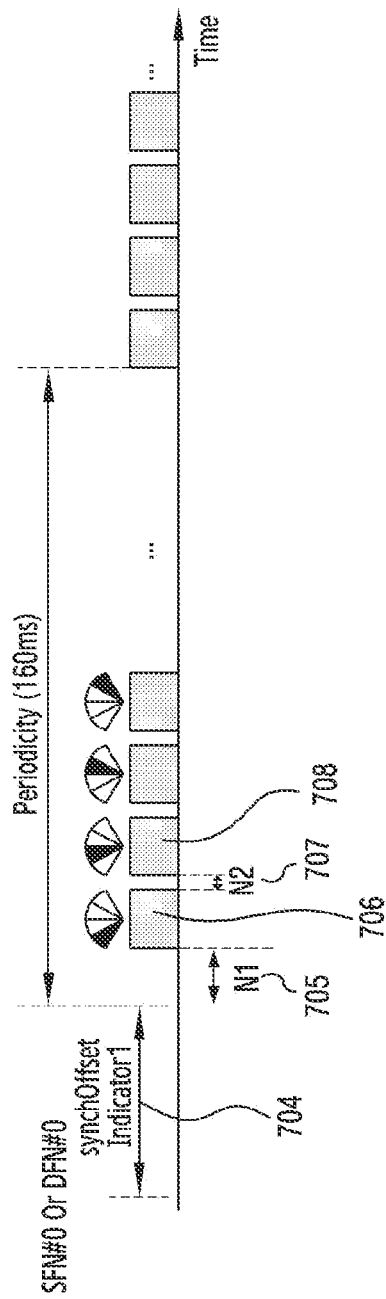
FIG. 7B illustrates an indication of an S-SSB transmission time within an S-SSB transmission periodicity and an operation of beam sweeping in a wireless communication system according to various embodiments of the disclosure.
Figure 7C:
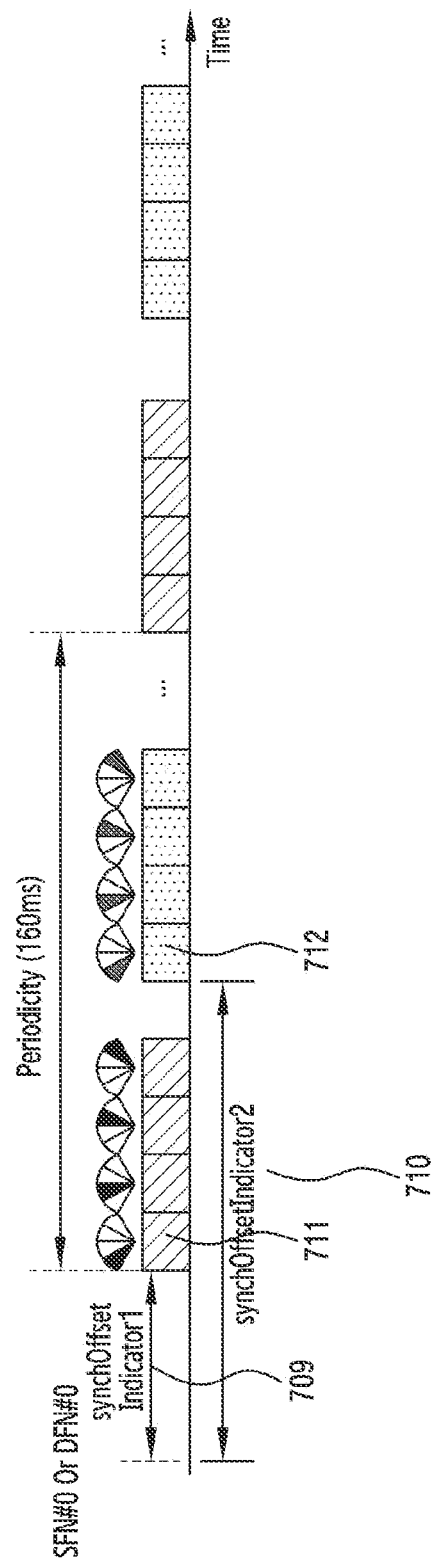
FIG. 7C illustrates an indication of an S-SSB transmission time within an S-SSB transmission periodicity and an operation of beam sweeping in a wireless communication system according to various embodiments of the disclosure.

FIGS. 7A to 7C illustrate a process of sweeping a beam during S-SSB transmission in a sidelink in a wireless communication system according to various embodiments of the disclosure.

FIG. 7A illustrates a structure of an S-SSB burst within an S-SSB transmission periodicity in a wireless communication system according to various embodiments of the disclosure.

First, in a sidelink, the UE may (pre-)configure the number of S-SSB transmissions (N) in S-SSB transmission periodicity. 160 ms for S-SSB transmission periodicity is supported for all SCSs in a sidelink. In addition, a value that can be configured as the number of S-SSB transmissions (N) within 160 ms periodicity may be limited as follows, with regard to an SCS and a frequency range (FR).

For FR1:
  For 15 kHz SCS, N={1}
  For 30 kHz SCS, N={1, 2}
  For 60 kHz SCS, N={1, 2, 4}
For FR2.
  For 60 kHz SCS, N={1, 2, 4, 8, 16, 32}
  For 120 kHz SCS, N={1, 2, 4, 8, 16, 32, 64}

FR1 and FR2 are classified according to a frequency domain. Specifically, FR1 indicates a case of using a frequency band of 6 GHz or less, and FR2 indicates a case of using a high frequency band such as 24.25 GHz to 52.6 GHz. Various embodiments of the disclosure are not limited to the values of N proposed above with regard to FR1 and FR2. In addition, when N>1, the S-SSB may be transmitted in one burst or may be transmitted in multiple bursts within the S-SSB periodicity. Specifically, FIG. 7A shows an embodiment in which the S-SSB transmission periodicity is configured by 20 slots and N=4. Here, the S-SSB may be transmitted in four bursts 701, or the S-SSB may be transmitted in two bursts 702, or the S-SSB may be transmitted in one burst 703.

When transmission is performed in multiple bursts, an offset value between bursts may be configured to indicate a location at which each burst is transmitted, as shown in FIG. 7A. For example, in a case of 4 bursts 701 in FIG. 7A, the offset value between bursts is 5 slots, and in a case of two bursts 702, the offset value between bursts is configured by 10 slots.

FIG. 7B illustrates an indication of an S-SSB transmission time within an S-SSB transmission periodicity and an operation of beam sweeping in a wireless communication system according to various embodiments of the disclosure.

FIG. 7B shows an embodiment in which the number of S-SSB transmissions in the S-SSB periodicity is configured to be 4 (N=4), and the start position at which S-SSBs 706 and 708 are transmitted is configured through one synchronization offset indicator 1 (synchOffsetIndicator1) 704, offset N1 705 from the start position of the S-SSB periodicity to the position at which S-SSB 706 is started, and interval N2 707 between the respective S-SSBs 706 and 708. In various embodiments of the disclosure, the interval N2 707 between the S-SSBs 706 and 708 is assumed to be constant. The values of synchOffsetIndicator1 704, N1 705, and N2 707 may be (pre-)configured with resource pool information. Alternatively, according to an embodiment, the value of N1 705 may be assumed to be zero. FIG. 7B illustrates an operation of sweeping a beam at every S-SSB transmission time point within the S-SSB periodicity.

FIG. 7C illustrates an indication of an S-SSB transmission time within an S-SSB transmission periodicity and an operation of beam sweeping in a wireless communication system according to various embodiments of the disclosure.

Unlike the embodiment of FIG. 7B, FIG. 7C shows an embodiment in which the number of S-SSB transmissions within the S-SSB periodicity is configured to be N=4 and the start position at which the S-SSB is transmitted is configured through two synchOffsetIndicators. In FIG. 7C, it is assumed that N1=0 and N2=0.

Referring to FIG. 7C, a start position 711 of beam sweeping on the S-SSB is determined by synchOffsetIndicator1 709, and a start position 712 of beam sweeping on another S-SSB is determined by synchOffsetIndicator2 710. The additional synchOffsetIndicator2 710 is required for the UE to avoid collision between S-SSB transmission and reception. For example, when the UE is located out-of-coverage (OOC) of a base station, the UE cannot simultaneously perform reception and transmission of S-SSB from and to another UE due to half-duplex. For example, it may be possible to receive the S-SSB from another UE at a time point configured as synchOffsetIndicator1 and transmit the S-SSB to another UE at a time point configured as synchOffsetIndicator2. On the contrary, it may be possible to transmit the S-SSB to another UE at a time point configured as synchOffsetIndicator1 and receive the S-SSB from another UE at a time point configured as synchOffsetIndicator2. Two or more synchOffsetIndicators for the start position at which the S-SSB is transmitted may be supported. FIG. 7C illustrates an operation of beam sweeping performed at every S-SSB transmission time within the S-SSB periodicity indicated through synchOffsetIndicator1 and synchOffsetIndicator2.

When the UE synchronizes with the base station (gNB/eNB) in a sidelink, the start position of the S-SSB may be configured based on a system frame number (SFN). Alternatively, when the UE synchronizes with a global navigation satellite system (GNSS) in a sidelink, the start position of the S-SSB may be configured based on a direct frame number (DFN).

In the above, a case in which a UE is located in-coverage (IC) of a base station has been described above through the embodiments of FIGS. 1A, 1B, and 1D. In this case, the UE may be a terminal in synchronization with a base station (gNB/eNB) or GNSS.

A case in which the UE is located out-of-coverage (OOC) of the base station has been described above through the embodiments of FIGS. 1B and 1C. In this case, the UE may be a terminal in synchronization with the GNSS.

In the sidelink, a resource pool in a time domain may be configured as described with reference to FIG. 3 except for slots to which S-SSB is periodically allocated based on SFN or DFN in a time domain.

When the sidelink and the Uu link are simultaneously managed in the same frequency band, the reception of a synchronization signal block (SSB) from the base station should also be considered when considering the beam sweeping operation during S-SSB transmission of the UE. In addition, when considering the beam sweeping operation during S-SSB transmission of the UE, there may be a case in which a physical random access channel (PRACH) should be transmitted to the base station.

Referring to FIG. 6A, the S-SSB is transmitted in one slot. In addition, referring to a configuration value of the number of S-SSB transmissions (N) within the S-SSB periodicity described above, when the S-SSB is transmitted in one burst, the S-SSB may be transmitted up to 8 ms (e.g., SCS=60 kHz, N=32 and SCS=120 kHz, N=64). Therefore, a collision may occur at the time of S-SSB transmission in the sidelink, SSB reception from the Uu link, and PRACH transmission to the Uu link.

The base station may prevent a case, in which the UE transmits S-SSB in the sidelink and at the same time the UE receives SSB from the base station in the Uu link, from occurring, through the configuration of periodicity and transmission time for SSB and S-SSB. However, in this case, there may be restrictions on the periodicity and transmission configuration for the SSB and S-SSB. On the other hand, at the time of considering an operation in which a beam is swept when the UE transmits the S-SSB in the sidelink, and when the UE needs to receive the SSB from the base station in the Uu link at the same time, the following method may be considered.

The UE cancels the S-SSB transmission in the sidelink and performs SSB reception from the base station in the Uu link.

When considering an operation in which a beam is swept during S-SSB transmission of the UE in the sidelink, and when the UE needs to transmit PRACH to the base station in the Uu link at the same time, the following method may be considered.

The UE cancels the S-SSB transmission in the sidelink and transmits the PRACH to the base station in the Uu link.

Second Embodiment

The second embodiment proposes a method for initially and rapidly determining beamforming when transmission/reception between UEs is performed in a sidelink. In a case of a sidelink, unlike a Uu interface between a base station and a UE, since two vehicle UEs can move at the same time at a high speed, beam management may become more difficult. In other words, as the determining of beamforming is delayed, the possibility in which the positions of two vehicle UEs may be changed and thus the formed beam is no longer a valid beam may increase. As such, in order to determine the beamforming initially and rapidly in the sidelink, it may be important to understand information related to the position and speed between two vehicles. Although the following description focuses vehicle-to-vehicle (V2V) communication, it should be noted that it can be applied to vehicle-to-everything (V2X) communication.

Figure 8:
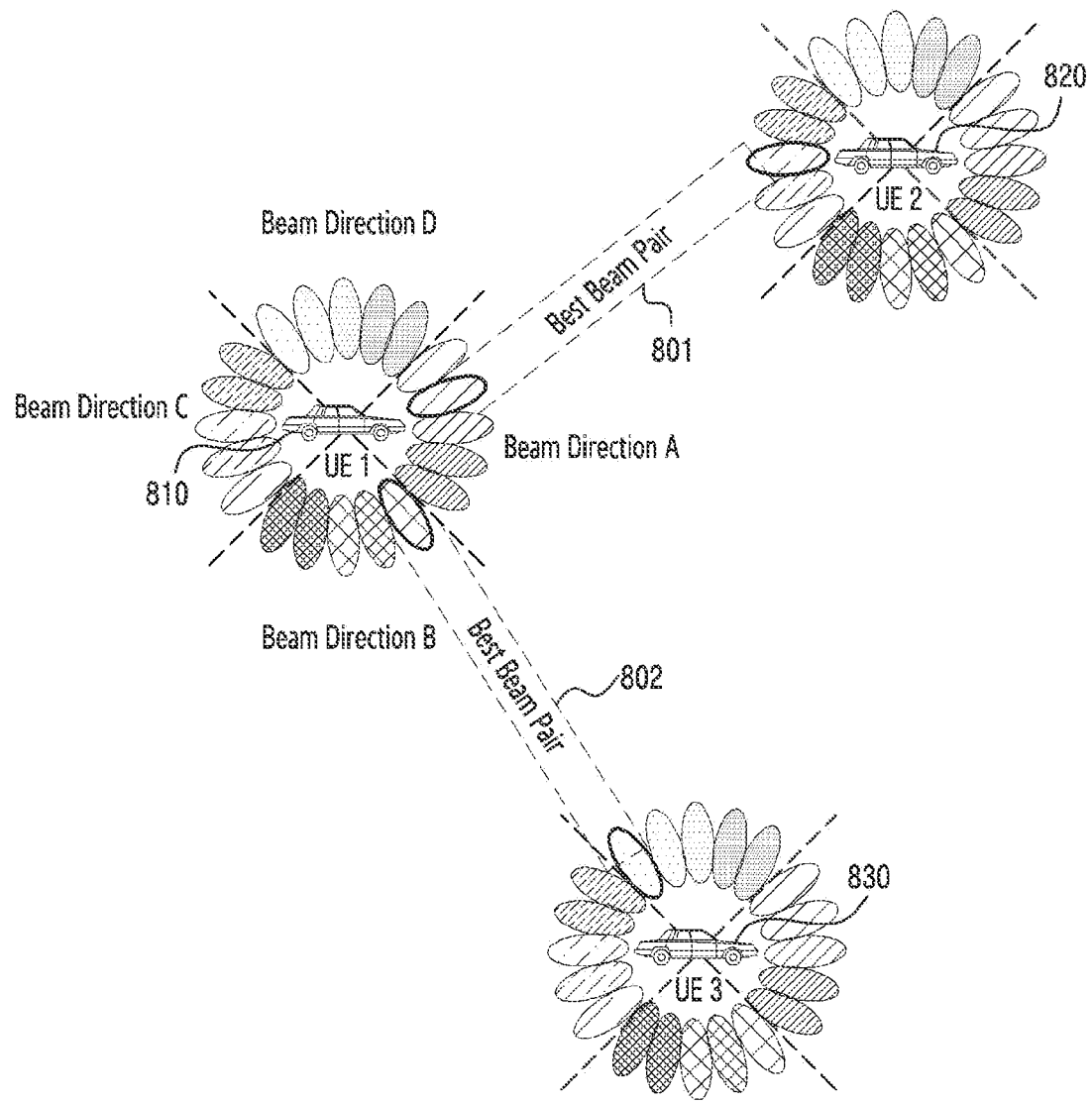
FIG. 8 illustrates an operation of determining beamforming by considering movement of a UE in a sidelink in a wireless communication system according to various embodiments of the disclosure.

FIG. 8 illustrates an operation of determining beamforming by considering the movement of a UE in a sidelink in a wireless communication system according to various embodiments of the disclosure.

Referring to FIG. 8, an example in which UE1 810 and UE2 820 determine a beam direction based on location information is illustrated. Further, an example in which UE1 810 and UE3 830 determine a beam direction based on location information is illustrated. In FIG. 8, it is assumed such that in each of the vehicle UEs 810, 820, and 830, panels for beamforming are mounted on a front bumper and a rear bumper, respectively, a panel mounted on the front bumper may form a beam in a 180-degree direction in front, and a panel mounted on the rear bumper may form a beam in a 180-degree direction in rear.

Specifically, referring to UE1 810 of FIG. 8, an example in which a beam is divided into four directions is illustrated. A beam direction that can be formed through the panel mounted on the front bumper is divided into beam direction A and beam direction B. A beam direction that can be formed through the panel mounted on the rear bumper is divided into beam direction C and beam direction D. First, when UE1 810 and UE2 820 determine a beam direction, when there is no location information of each UE, each UE may have to determine a beam direction among all directions, that is, 360 degrees. However, when location information is given, UE1 810 may determine a beam direction in beam direction A, and UE2 820 may determine a beam direction in beam direction C. FIG. 8 shows an example of the best beam pair according to various embodiments of the disclosure (indicated by reference numeral 801). Similarly, when UE1 810 and UE3 830 determine a beam direction, when there is no location information of each UE, each UE may have to determine a beam direction among all directions, that is, 360 degrees. However, when location information is given, UE1 810 may determine a beam direction in beam direction B, and UE3 830 may determine a beam direction in beam direction D. FIG. 8 shows an example of the best beam pair according to various embodiments of the disclosure (indicated by reference numeral 802). Accordingly, according to various embodiments of the disclosure, the determination of beamforming can be performed more rapidly and accurately in the initial stage. In addition, the accuracy of beamforming and the time taken for beam determination may vary depending on the number of beams and a beam width. The more the number of beams and the narrower the beam width, the more accurate the beam direction can be determined, but the time and complexity required to determine the final beam direction can increase. In addition, when the speed information of the UEs is given, specifically, as the relative speed between the UEs increases, the possibility in which a beam formed by the position change of the two vehicle UEs may no longer be a valid beam may increase. Therefore, beam management for configuring a small number of beams and forming a wide beam width can be advantageous. Accordingly, it can be very important for beam management to identify information related to the position and speed between two vehicles.

As described with reference to FIG. 8, information related to a position and speed between two vehicle UEs may be obtained using various methods.

According to an embodiment, a method of tracking vehicle-to-vehicle location information based on a sensor mounted on a vehicle may be considered. For example, a sensor mounted on a vehicle may operate based on a radar signal, and accordingly, whether there is a counterpart vehicle and relative location information (such as distance and angle information from the counterpart vehicle) may be detected. A camera mounted on the vehicle as well as a sensor of the vehicle may also be used to determine location information between vehicles. However, when location information acquired through equipment such as a sensor and a camera mounted on a vehicle is not accurate, beam management through this may also be inaccurate.

According to an embodiment, a method in which information related to vehicle-to-vehicle position and speed is obtained through message exchange at an application end of a sidelink protocol may be considered. Specifically, a message such as a basic safety message (BSM) may be exchanged between UEs. The BSM is periodically transmitted as a safety-related message and may include information such as the absolute position of a UE, direction of travel, speed, and size. However, when message exchange at the application end of the sidelink protocol is not performed, information related to vehicle-to-vehicle position and speed may not be acquired.

According to an embodiment, in unicast communication of sidelink, a method in which information related to vehicle-to-vehicle position and speed is transmitted through a physical layer such as SCI or to higher layers such as PC5-MAC and PC5-RRC may be considered. When beam management is performed through signals measured at the physical layer and instructions from higher layers such as PC5-MAC and PC5-RRC, a method of acquiring information related to vehicle-to-vehicle position and speed in the relevant sidelink protocol would be more advantageous for beam management.

The method for acquiring information related to the vehicle-to-vehicle position and speed is not limited to the above-described embodiments. Further, more than one embodiment presented above may be contemplated simultaneously. In various embodiments of the disclosure, a method of obtaining information related to the vehicle-to-vehicle position and speed may be limited to sidelink unicast communication.

Third Embodiment

The third embodiment proposes a method of introducing a periodic sidelink channel state information reference signal (SL CSI-RS) to perform beam tracking rapidly and continuously in the sidelink. In addition, a method for periodically supporting sidelink channel state information (SL CSI) reporting including beam information is proposed. In the disclosure, transmission of SL CSI-RS and reporting of SL CSI may be limited to sidelink unicast communication. As the positions of the two vehicle UEs are rapidly changed in the sidelink and a narrow beam is applied, the possibility in which the formed beam is no longer a valid beam may increase. Accordingly, beam tracking needs to be performed rapidly and continuously. In addition, in order to support this, it is necessary to report a periodically transmitted beam reference and beam-related information. Theoretically, beam tracking can be smoothly supported only when reporting of a beam reference and beam information is supported every beam coherence time. In various embodiments of the disclosure, a beam reference for beam tracking in the sidelink is referred to as SL CSI-RS. However, the name for the beam reference may be called differently. In addition, the beam reference may be used not only for beam tracking, but also for identifying and synchronizing a channel state of a sidelink. In addition, when reporting the beam related information, other channel state information, as well as the beam related information, may be reported together. Accordingly, various embodiments of the disclosure describe a method for supporting periodic beam-related information reporting as a method for supporting periodic SL CSI reporting. A case in which other channel state information as well as the beam related information are reported together will be described with reference to the fourth embodiment.

First, a method of supporting periodic SL CSI-RS transmission and SL CSI reporting in a sidelink will be described.

Figure 9A:
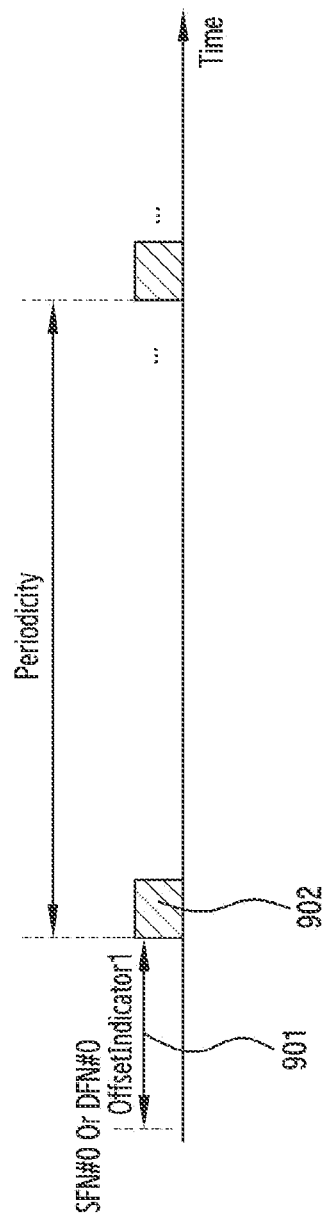
FIG. 9A illustrates a method of supporting periodic SL CSI-RS transmission and SL CSI reporting in a sidelink in a wireless communication system according to various embodiments of the disclosure.
Figure 9B:
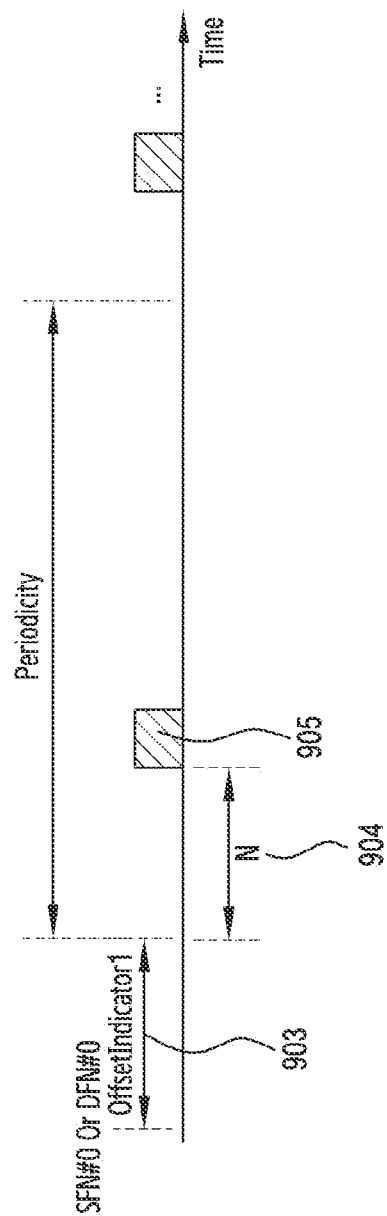
FIG. 9B illustrates a method of supporting periodic SL CSI-RS transmission and SL CSI reporting in a sidelink in a wireless communication system according to various embodiments of the disclosure.

FIGS. 9A to 9B illustrate a method of supporting periodic SL CSI-RS transmission and SL CSI reporting in a sidelink in a wireless communication system according to various embodiments of the disclosure.

Referring to FIGS. 9A and 9B, methods for configuring, by a UE, a periodicity for SL CSI-RS transmission and for transmission of SL CSI reporting in a sidelink and a start position of the periodicity are illustrated.

First, according to the embodiment of FIG. 9A, a start position 902 of the periodicity may be configured through OffsetIndicator1 901 based on the SFN or DFN. On the other hand, according to the embodiment of FIG. 9B, a start position 905 of the periodicity may be configured through OffsetIndicator1 903 based on the SFN or DFN, and offset N 904 from a start position of the periodicity for SL CSI-RS transmission and SL CSI reporting to a position in which the SL CSI-RS transmission and transmission of SL CSI reporting starts.

The following values may be considered as values that can be configured for a periodicity for transmission of the SL CSI-RS. CSI-ResourcePeriodicity={slots4, slots5, slots8, slots10, slots16, slots20, slots32, slots40, slots64, slots80, slot160, slots320, and slots640}. In CSI-ResourcePeriodicity, slots4 indicates that SL CSI-RS is transmitted every 4 slots, and slots5 indicates that SL CSI-RS is transmitted every 5 slots.

The following values may be considered as values that can be configured for a periodicity for transmission of the SL CSI report. CSI-ReportPeriodicity={slots4, slots5, slots8, slots10, slots16, slots20, slots40, slots80, slot160, and slots320}. In CSI-ReportPeriodicity, slots4 indicates that SL CSI-RS is transmitted every 4 slots, and slots5 indicates that SL CSI-RS is transmitted every 5 slots. Alternatively, periodic transmission for SL CSI-RS transmission and SL CSI reporting may be configured similarly to periodic transmission of S-SSB as described in the first embodiment. Specifically, 160 ms of a periodicity for SL CSI-RS transmission and SL CSI reporting is supported, and the number of transmissions (N) for SL CSI-RS transmission and SL CSI reporting may be configured within a periodicity. For more detailed description, FIGS. 7A to 7C are referred to.

The transmission periodicity and start position of the SL CSI-RS and the transmission periodicity and start position for the SL CSI reporting may be (pre-)configured with resource pool information. On the other hand, the transmission periodicity and start position of the SL CSI-RS and the transmission periodicity and start position for the SL CSI reporting may be configured through PC5-RRC. More specifically, SL CSI-RS transmission and SL CSI reporting in a sidelink may be defined as a CSI framework. The CSI framework may be (pre-)configured with resource pool information or may be configured through PC5-RRC. The CSI framework may be configured by two elements: a resource setting for SL CSI-RS transmission and a report setting for SL CSI reporting. The report setting may configure at least one or more links with reference to the ID of the resource setting. At least one resource setting may be configured in a receiving UE. Each resource setting may include at least one resource set. Each resource set may include at least one SL CSI-RS resource. Each resource may include detailed information of the SL CSI-RS, for example, information of a transmission band in which the SL CSI-RS is transmitted (e.g., a sidelink bandwidth part (SL BWP), location information of a resource element (RE) in which the SL CSI-RS is transmitted, an SL CSI-RS transmission periodicity and an offset in the time axis, the number of ports of SL CSI-RS, and the like. The report setting may include information related to the SL CSI reporting method. The base station may configure at least one report setting in the UE. In this case, each report setting may be configured such that configuration information for SL CSI reporting, for example, information of a band on which SL CSI is reported (e.g., SL BWP), a time-domain behavior for SL CSI reporting, a transmission periodicity and an offset in the time axis for SL CSI report, frequency granularity for SL CSI reporting, configuration information for measurement restriction, and a report quantity (reportQuantity) which is information included in SL CSI may be included in parameter information of SL-CSI-ReportConfig.

When the UE synchronizes with the base station (gNB/eNB) in a sidelink, the start positions of the SL CSI-RS and SL CSI reporting may be configured based on a system frame number (SFN). Alternatively, when the UE synchronizes with the GNSS in a sidelink, the start position of the S-SSB may be configured based on a direct frame number (DFN). A resource pool in time may be configured as described with reference to FIG. 3 except for slots to which SL CSI-RS and SL CSI reporting are periodically allocated in time based on SFN or DFN in a sidelink.

As described through the first embodiment, there is S-SSB as a periodic signal transmitted through the sidelink, and as described through the third embodiment, SL CSI-RS and SL CSI reporting may be periodically transmitted in time. As such, when configuring a resource pool in time except for all of slots in which periodic signals are transmitted through the sidelink, available resource pools in time may be limited. For example, when a periodicity in which a periodic signal is transmitted is very short, and when a slot allocated for periodic S-SSB, SL CSI-RS, and SL CSI reporting is excluded, the available resource pools in time are reduced. Therefore, unlike a method of allocating respective independent resources for periodic S-SSB, SL CSI-RS, and SL CSI reporting, a method of allocating a periodic resource to one resource and simultaneously using the same may be considered. For example, a method in which a resource allocated for S-SSB transmission is utilized as a resource for SL CSI-RS transmission and SL CSI reporting may be considered. Since a case may occur such that the UE does not use a resource allocated for S-SSB transmission according to a sidelink scenario, in case that the S-SSB is transmitted, a method of rate-matching the SL CSI-RS to the corresponding resource region and performing transmission thereof is considered. On the other hand, when there is no SSB transmission, only the SL CSI-RS may be transmitted in a region of SL BWP at the corresponding time point.

Figure 9C:
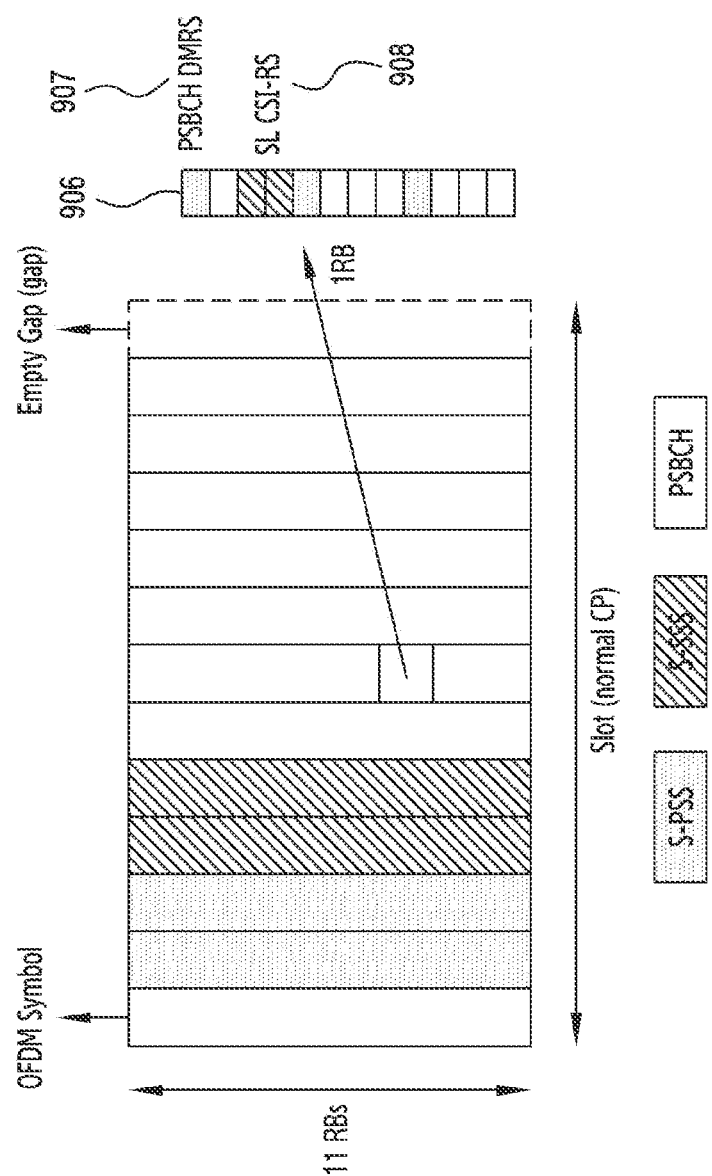
FIG. 9C illustrates a method of allocating a resource for SL CSI-RS transmission to a resource allocated for periodic S-SSB transmission in a sidelink in a wireless communication system according to various embodiments of the disclosure.

FIG. 9C illustrates a method of allocating a resource for SL CSI-RS transmission to a resource allocated for periodic S-SSB transmission in a sidelink in a wireless communication system according to various embodiments of the disclosure.

Referring to FIG. 9C, a method in which an SL CSI-RS is rate-matched to a region for transmission of a PSBCH and transmitted is proposed. Here, although the PSBCH is also transmitted through the first symbol of the slot, the SL CSI-RS may not be transmitted through the first symbol of the slot because the first symbol may be used as a region for automatic gain control (AGC). Referring to FIG. 9C, the location of an RE 908 for transmission of the SL CSI-RS, except for an RE 907 for transmission of a PSBCH DMRS, may be configured within each RB 906 in which the PSBCH is transmitted. In addition, the SL CSI-RS may be transmitted for every RB in a frequency domain 11 RB in which the PSBCH is transmitted, and may be transmitted for every RB even in a region in which there is no PSBCH transmission even though it is configured as the SL BWP.

In addition, multiple CSI-RS resources need to be configured for beam management in a sidelink. Specifically, for beam management, when configuring RE location information for transmission of SL CSI-RSs to multiple CSI-RS resources, RE locations of SL CSI-RS corresponding to different CSI-RS resources may be mapped to different symbols in order to apply different analog beams. This is because it is difficult to apply different analog beams through the same symbol. A method of allocating resources for SL CSI-RS transmission to resources allocated for periodic S-SSB transmission may be limited to sidelink unicast communication. Therefore, when the UE transmits the S-SSB using the unicast link, the SL CSI-RS is transmitted together with the S-SSB to a resource allocated for S-SSB transmission, and when the UE transmits the S-SSB through broadcast, a beam reference, for example, SL CSI-RS, may not be transmitted together with the S-SSB to a resource allocated for S-SSB transmission. In addition, even when S-SSB is transmitted using a unicast link, if beam management is disabled, a beam reference, for example, SL CSI-RS may not be transmitted together with the S-SSB to a resource allocated for S-SSB transmission. When a unicast link is connected via PC5-RRC, information related to beam management, for example, whether beam management is enabled/disabled, and periodic SL CSI-RS configuration information are configured in PC5-RRC, so that the S-SSB can be transmitted and received by assuming the configuration information between UEs using a unicast link. On the other hand, other UEs not connected in a unicast may not know whether a resource allocated for S-SSB transmission is allocated with a beam reference, for example, a resource for SL CSI-RS transmission as shown in FIG. 9C, there is no transmission of a beam reference, for example, SL CSI-RS, to the resource allocated for S-SSB transmission. Various embodiments of the disclosure are not limited to the SL CSI-RS pattern illustrated in FIG. 9C. In addition, various embodiments of the disclosure may consider a method of utilizing the S-PSS and S-SSS of FIG. 9B as a beam reference (SL CSI-RS) without additionally allocating the SL CSI-RS transmission resource as shown in FIG. 9C.

Figure 9D:
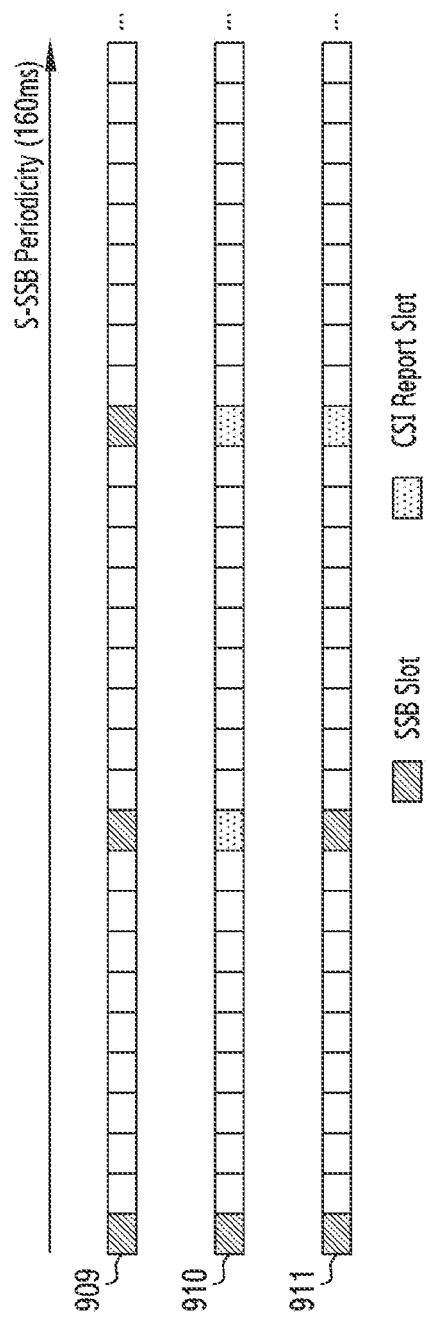
FIG. 9D illustrates a method of allocating a resource for SL CSI reporting to a resource allocated for periodic S-SSB transmission in a sidelink in a wireless communication system according to various embodiments of the disclosure.

FIG. 9D illustrates a method of allocating a resource for SL CSI reporting to a resource allocated for periodic S-SSB transmission in a sidelink in a wireless communication system according to various embodiments of the disclosure.

Referring to FIG. 9D, a case in which N>1 is configured and multiple S-SSBs are transmitted within the S-SSB periodicity is shown (indicated by reference numeral 909). According to the method described in FIG. 9B, the SL CSI-RS may be rate-matched to a PSBCH region and transmitted at a time point at which the S-SSB is transmitted. According to the periodicity configuration of SL CSI-RS, the SL CSI-RS may be transmitted in every slot in which the S-SSB is transmitted, or may be transmitted only in a part thereof. Further, referring to FIG. 9D, a case in which a part of the time point at which the S-SSB is transmitted is used for SL CSI reporting is shown (indicated by reference numeral 910). In addition, referring to FIG. 9D, apart of the time point at which the S-SSB is transmitted is used for SL CSI reporting (indicted by reference numeral 911). Compared to the case of reference numeral 911, the SL CSI reporting occurs more frequently in case of reference numeral 910. Resources for SL CSI reporting may be allocated to resources allocated for S-SSB transmission through various methods according to the periodicity configuration for SL CSI reporting.

Not only when a method of utilizing a resource allocated for S-SSB transmission as a resource for SL CSI-RS transmission and SL CSI reporting is used, but also even when resources are allocated independently for periodic S-SSB, SL CSI-RS, and SL CSI reporting, a time point configured for periodic S-SSB transmission may collide with a time point configured for periodic SL CSI-RS transmission and SL CSI reporting due to the configuration of a periodicity and a start time for the corresponding transmission.

Figure 9E:
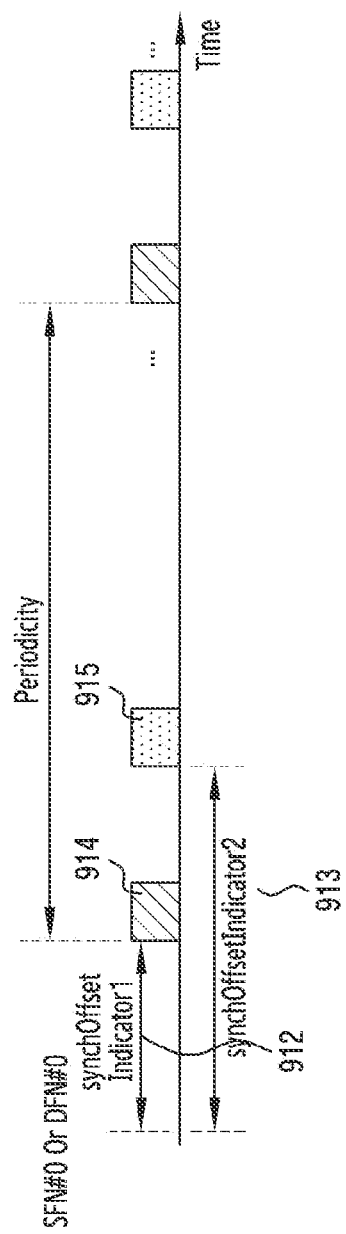
FIG. 9E illustrates a case in which a plurality of Offset-Indicators are supported when periodic SL CSI-RS transmission and SL CSI reporting are supported in a sidelink in a wireless communication system according to various embodiments of the disclosure.

FIG. 9E illustrates a case in which multiple OffsetIndicators are supported when periodic SL CSI-RS transmission and SL CSI reporting are supported in a sidelink in a wireless communication system according to various embodiments of the disclosure.

Referring to FIG. 9E, a start position at which SL CSI-RS transmission and SL CSI reporting are transmitted is configured through two OffsetIndicators. A start position 914 at which SL CSI-RS transmission and SL CSI reporting are transmitted is determined by OffsetIndicator1 912, and a start position 915 at which another SL CSI-RS transmission and SL CSI reporting are transmitted is determined by OffsetIndicator2 913. By introducing the additional OffsetIndicator2 913, it is possible to prevent collisions for periodic S-SSB, SL CSI-RS, and SL CSI reporting.

In the embodiment of FIG. 9E, a configuration value indicating a start position at which SL CSI-RS transmission and SL CSI reporting are transmitted may be (pre-)configured with resource pool information or configured via PC5-RRC.

Figure 9F:
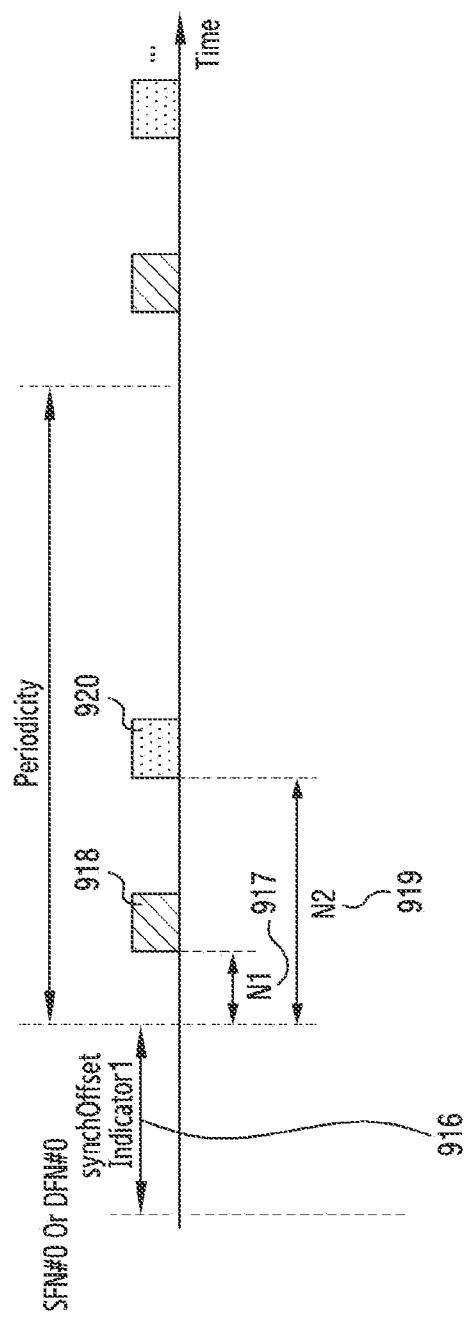
FIG. 9F illustrates a case in which a plurality of offset values are supported when periodic SL CSI-RS transmission and SL CSI reporting are supported in a sidelink in a wireless communication system according to various embodiments of the disclosure.

FIG. 9F illustrates a case in which multiple offset values are supported when periodic SL CSI-RS transmission and SL CSI reporting are supported in a sidelink in a wireless communication system according to various embodiments of the disclosure.

As an embodiment different from the embodiment of FIG. 9E, a method of FIG. 9F may be used.

Referring to FIG. 9F, multiple positions 918 and 910 at which SL CSI-RS transmission and SL CSI reporting are transmitted may be determined using multiple offset values N1 917 and N2 919 at the start time point of the periodicity.

In the embodiment of FIG. 9F, a configuration value indicating a start position at which SL CSI-RS transmission and SL CSI reporting are transmitted may be (pre-)configured with resource pool information or configured via PC5-RRC.

Figure 9G:
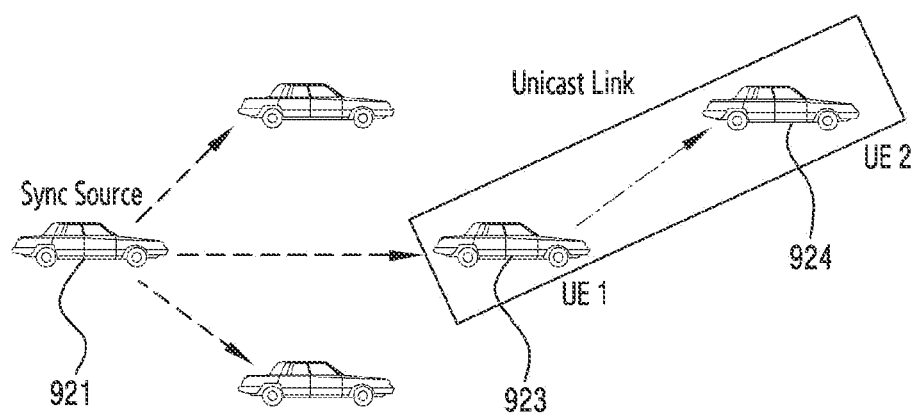
FIG. 9G illustrates a case in which a collision between periodic S-SSB transmission and reception occurs when periodic SL CSI-RS transmission and SL CSI reporting are supported in a sidelink in a wireless communication system according to various embodiments of the disclosure.

FIG. 9G illustrates a case in which a collision between periodic S-SSB transmission and reception occurs when periodic SL CSI-RS transmission and SL CSI reporting are supported in a sidelink in a wireless communication system according to various embodiments of the disclosure.

Referring to FIG. 9G, when a UE 921, which functions as a synch source, transmits S-SSB, a collision may occur between a time point at which a UE 923 should receive the S-SSB from the UE 921 and a time point at which the UE 923 performs periodic SL CSI-RS transmission. As such, when a time point configured for periodic S-SSB reception and a time point configured for periodic SL CSI-RS transmission and SL CSI reporting collide, the following scheme may be considered.

The UE cancels the SL CSI-RS transmission and receives the S-SSB.

The UE cancels the SL CSI reporting and receives the S-SSB.

Fourth Embodiment

The fourth embodiment describes in detail a method of supporting beam tracking of a transmitting UE (Tx beam tracking) and beam tracking of a receiving UE (Rx beam tracking) in supporting beam tracking in a sidelink. As described above, in theory, beam tracking can be smoothly supported only when reporting of a beam reference and beam information is supported every beam coherence time. Therefore, through the third embodiment, a method for introducing periodic SL CSI-RS as a beam reference for beam tracking in a sidelink and a method for supporting periodic SL CSI reporting as a method for reporting periodic beam-related information have been described. Various embodiments of the disclosure propose a method of performing beam tracking through such periodic beam reference and beam reporting.

Figure 10A:
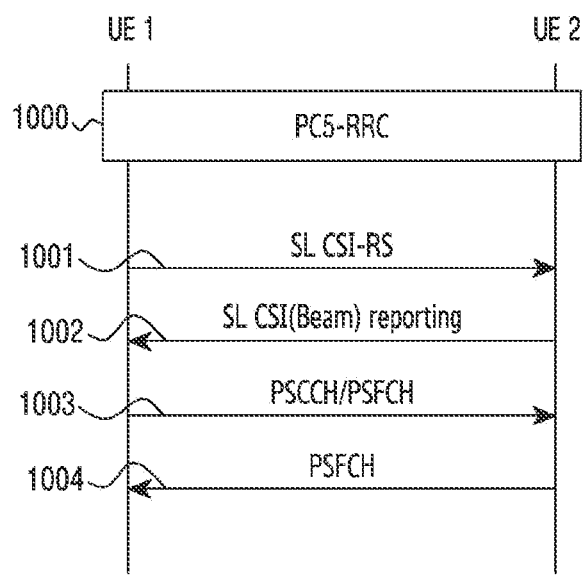
FIG. 10A illustrates a method of performing beam tracking in a wireless communication system according to various embodiments of the disclosure.

FIG. 10A illustrates a method of performing beam tracking in a wireless communication system according to various embodiments of the disclosure.

In a sidelink, a UE may be a transmitting UE or a receiving UE at any time. In various embodiments of the disclosure, a UE for signal transmission is referred to as a transmitting UE, and a UE for signal reception is referred to as a receiving UE. In FIG. 10A, UE 1 corresponds to a transmitting UE and UE 2 corresponds to a receiving UE.

FIG. 10A illustrates an overall flowchart of performing beam tracking in a sidelink according to an embodiment of the disclosure. In various embodiments of the disclosure, support for beam tracking may be limited to sidelink unicast communication.

In operation 1000, a procedure for establishing a unicast link between UEs in a sidelink may be performed. For example, a security-related message may be exchanged between UEs through PC5-S signaling, and thereafter, a message for establishing PC5-RRC may be exchanged and finally PC5-RRC may be connected. In the disclosure, a method of performing beam tracking using SL CSI-RS as a beam reference with respect to transmission through a channel of PSSCH/PSSCH/PSFCH through a sidelink after establishment of PC5-RRC will be mainly described. However, even before establishment of PC5-RRC, when operating at a high frequency such as FR2, beam management may be required in the process of exchanging messages between UEs. In this case, since the periodic SL CSI-RS transmission and the periodic SL CSI reporting (beam reporting) can be transmitted even before PC5-RRC establishment, beam management can be performed using the periodic SL CSI- RS transmission and the periodic SL CSI reporting. However, in this case, since it is before PC5-RRC establishment, configurations related to periodic SL CSI-RS transmission and periodic SL CSI reporting (beam reporting) may be (pre-)configured with resource pool information. Alternatively, it may be considered that the sidelink operates in FR1 before establishment of PC5-RRC and that the sidelink operates in FR2 after establishment of PC5-RRC. Such an operation may be referred to as FR1 assisted FR2. In other words, for the purpose of transmitting high-capacity data to FR2 through the PSSCH, a channel (PSCCH/PSFCH) related thereto may be supported by FR2, and other sidelink transmission/reception may be supported by FR1.

In operation 1000, location and speed information between UEs may be exchanged during PC5-RRC connection. In addition, information for beam management may be configured through PC5-RRC. Specifically, enabling/disabling of beam management, a transmission periodicity and start position of SL CSI-RS, and a transmission periodicity and start position of SL CSI reporting may be configured through PC5-RRC. More specifically, the CSI framework described through the third embodiment may be configured through PC5-RRC. When the CSI framework information including the transmission periodicity and start position of the SL CSI-RS and the transmission periodicity and start position for the SL CSI reporting is configured through a resource pool, the information configured through the PC5-RRC may overwrite or take precedence over information configured through the resource pool. For example, resource element (RE) location information for transmission of SL CSI-RS to one CSI-RS resource may be configured in the resource pool. However, it is necessary to configure multiple SL CSI-RS resources for beam management in the sidelink. Therefore, although RE location information for transmission of SL CSI-RS for multiple SL CSI-RS resources may be configured through PC5-RRC, respectively, and only one SL CSI-RS resource is configured in the resource pool, the UE may follow the configuration for multiple SL CSI-RS resources configured through PC5-RRC.

More specifically, when configuration RE location information for transmission of SL CSI-RSs to multiple SL CSI-RS resources for beam management, RE locations of SL CSI-RS corresponding to different SL CSI-RS resources may be mapped to different symbols in order to apply different analog beams. This is because different analog beams are difficult to be applied through the same symbol. Although an embodiment of information on SL CSI-RS resources has been described above, an operation in which the information configured through the PC5-RRC overwrites or takes precedence over information configured through the resource pool may be applied to both the resource setting for the SL CSI-RS transmission and the resource setting for the SL CSI reporting of the CSI framework.

In operation 1001, a transmitting UE (UE1) may transmit a periodic sidelink channel state information reference signal (SL CSI-RS) based on configured information.

In operation 1002, a receiving UE (UE2) may report preferred beam information by using a beam tracking result based on the SL CSI-RS, which is received in operation 1001. In this case, other SL CSI information such as other RIs and CQIs as well as beam information may be reported together. In addition, the location and speed information of the UE may be included in the SL CSI information. For details on this, the following sixth embodiment will be referred to.

In operation 1003, the transmitting UE (UE1) may transmit a signal to the receiving UE (UE2) by forming a beam for PSCCH/PSSCH based on the beam information received in the previous operation.

In operation 1004, the receiving UE (UE2) may transmit acknowledgement/not-acknowledgement (ACK/NACK) information for the received PSSCH to the transmitting UE (UE1) through the PSFCH. For details on the beamforming method therefor, the following fifth embodiment will be referred to.

Next, a method of performing beam tracking in the sidelink will be described in detail with reference to FIGS. 10B, 10C, and 10D.

Figure 10B:
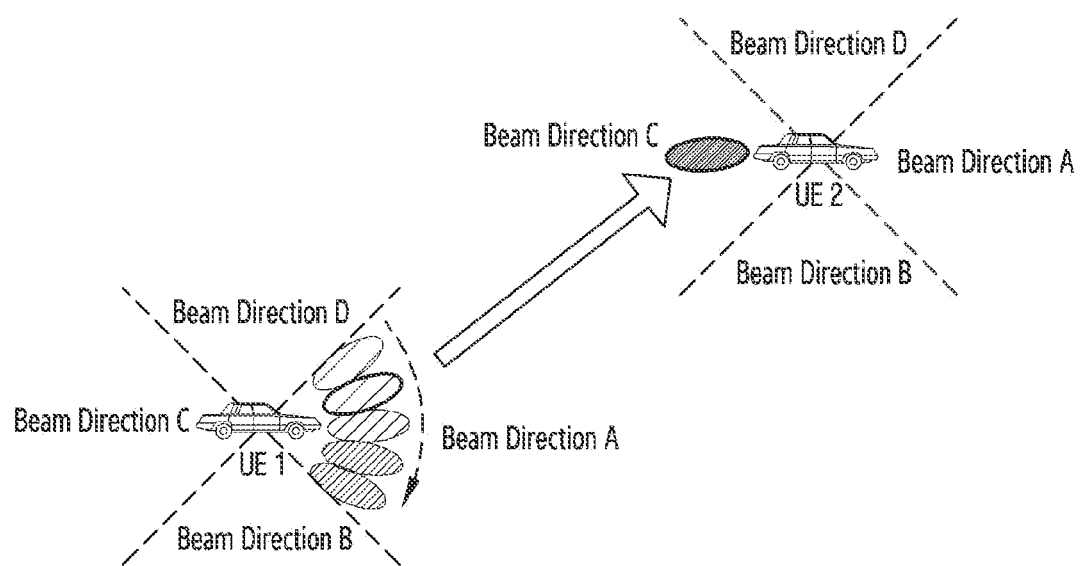
FIG. 10B illustrates a process of performing beam tracking of a transmitting UE (Tx beam tracking) in a wireless communication system according to various embodiments of the disclosure.

FIG. 10B illustrates a process of performing beam tracking of a transmitting UE (Tx beam tracking) in a wireless communication system according to various embodiments of the disclosure.

For beam tracking of a transmitting UE, a method of configuring multiple SL CSI-RS resources and transmitting the respective SL CSI-RS resources through different beams may be considered. Such a method may be referred to as "multiple CSI-RS resources without repetition." As described above, in order to apply different analog beams, RE locations of SL CSI-RSs mapped to SL CSI-RS resources may be mapped to different symbols. Accordingly, the receiving UE (UE2) may assume that respective configured SL CSI-RS resources are transmitted through different beams. Referring to FIG. 10B, the transmitting UE (UE1) and the receiving UE (UE2) may determine a beam direction and a beam width/the number of beams based on the location and speed information between the UEs. When determining the number of beams, the maximum value of the maximum number of beams that can be formed is configured according to a channel busy ratio (CBR) level measured by the UE, and thus the number of beams that can be formed may be limited. This can be a method for controlling a situation of sidelink congestion by controlling the number of beams according to the CBR.

In FIG. 10B, the transmitting UE (UE1) forms five beams in beam direction A, and the receiving UE (UE2) forms one fixed beam in beam direction C. Accordingly, the receiving UE (UE2) may measure reception reference signal received power (RSRP) for different beams transmitted by the transmitting UE (UE1), so as to find the best transmission beam. Here, the receiving UE (UE2) may report X CSI-RS resource indicators (CRIs) (X≥1). In addition, the receiving UE (UE2) may report an RSRP value for each CRI. Here, a method of reporting RSRP values for all CRIs and a method of reporting the measured RSRP value for the best beam and reporting a differential RSRP value for the remaining beams may be considered.

Figure 10C:
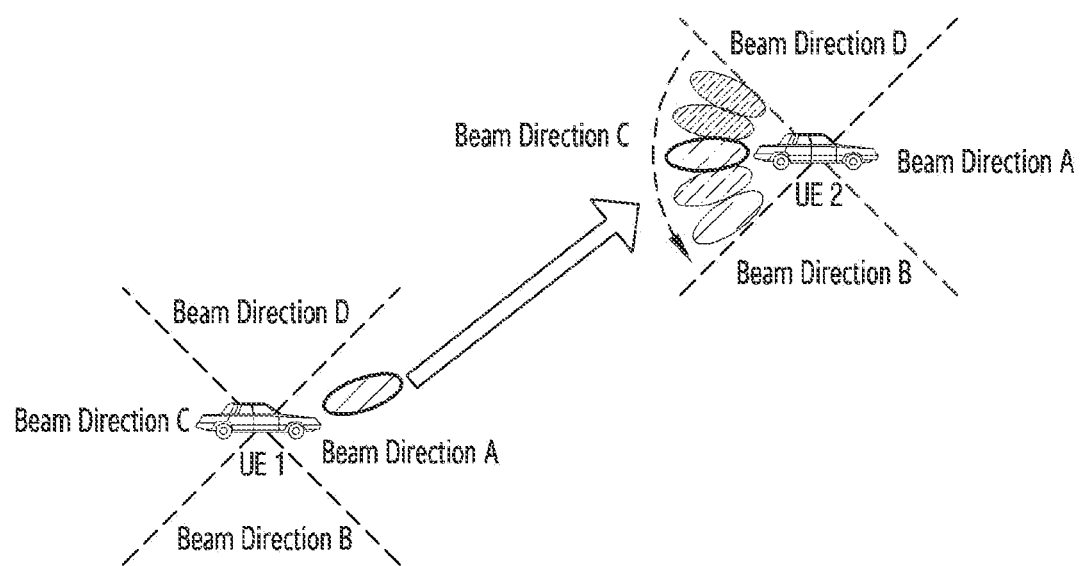
FIG. 10C illustrates a process of performing beam tracking of a receiving UE (Rx beam tracking) according to various embodiments of the disclosure.

FIG. 10C illustrates a process of performing beam tracking of a receiving UE (Rx beam tracking) according to various embodiments of the disclosure.

Referring to FIG. 10C, multiple SL CSI-RS resources are configured for beam tracking of a transmitting UE, and the respective SL CSI-RS resources are transmitted through the same beam. This method may be referred to as "multiple CSI-RS resources with repetition." Accordingly, a receiving UE (UE2) may assume that respective configured SL CSI-RS resources are transmitted through the same beam. Referring to FIG. 10C, the transmitting UE (UE1) and the receiving UE (UE2) may determine a beam direction and a beam width/the number of beams based on the location and speed information between the UEs. When determining the number of beams, the maximum value of the maximum number of beams that can be formed is configured according to the CBR level measured by the UE, and thus the number of beams that can be formed may be limited. This can be a method for controlling a situation of sidelink congestion by controlling the number of beams according to the CBR.

In FIG. 10C, the transmitting UE (UE1) forms one beam in beam direction A, and the receiving UE (UE2) forms multiple beams in beam direction C. Therefore, the receiving UE (UE2) may measure RSRP received with different beams with regard to different beams transmitted by the transmitting UE (UE1), respectively, so as to find the best reception beam. Here, unlike the beam tracking of the transmitting UE (the Tx beam tracking), the receiving UE (UE2) may report only the RSRP value for the best beam.

Figure 10D:
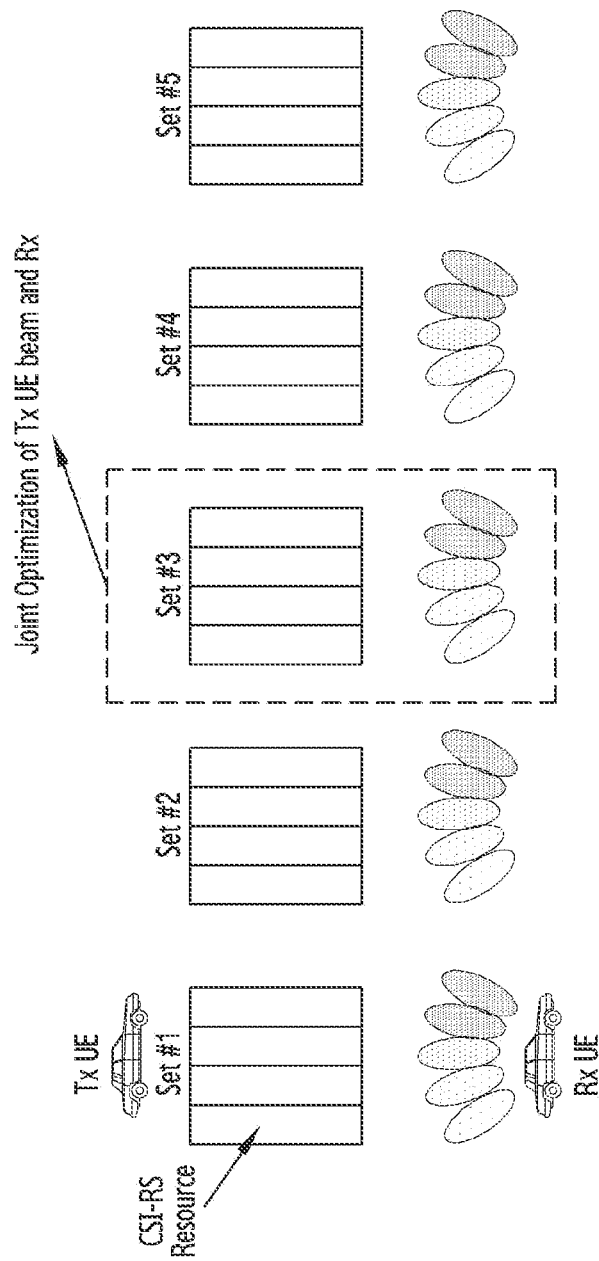
FIG. 10D illustrates a process in which a UE initially performs beamforming in a sidelink in a wireless communication system according to various embodiments of the disclosure.

FIG. 10D illustrates a process in which a UE initially performs beamforming in a sidelink in a wireless communication system according to various embodiments of the disclosure.

Specifically, by applying the above-described CSI framework and "multiple CSI-RS resources without repetition," the beam tracking of the transmitting UE (Tx beam tracking) and the beam tracking of the receiving UE (Rx beam tracking) can be performed simultaneously.

As shown in FIG. 10D, the transmitting UE (UE1) may consider a method of configuring multiple resource sets and transmitting respective resource sets through different beams. Each resource set may include multiple SL CSI-RS resources. In addition, it is assumed that multiple SL CSI-RS resources are transmitted through the same beam. Therefore, the receiving UE (UE2) may form multiple reception beams, by assuming that the transmitting UE (UE1) transmits SL CSI-RS resources in each resource set through the same beam, to measure the RSRP in each resource set and find the best reception beam. At the same time, the receiving UE (UE2) may measure RSRP for each resource set, by assuming that respective resource sets are transmitted through different beams, to find the best reception beam. Accordingly, the receiving UE (UE2) may find the best reception beam for all resource sets. In addition, when the receiving UE (UE2) reports the RSRP value corresponding to the best reception beam for each resource set to the transmitting UE (UE1), the transmitting UE (UE1) may also find the best transmission beam. That is, joint optimization of the transmission UE beam (Tx UE beam) and the reception UE beam (Rx UE beam) may be performed.

Fifth Embodiment

The fifth embodiment describes a method of supporting beam indication in a sidelink. The beam indication may be performed through transmission configuration indicator (TCI) state configuration, and one TCI state may include a reference signal (RS) ID and quasi co-location (QCL) information. Here, the RS ID may be an ID for RS used as a beam reference, and may transmit information on a QCL relationship between antenna ports (e.g., PSCCH DMRS port, PSSCH DMRS port, or CSI-RS port of SL CSI-RS) for transmitting a sidelink channel in order for the UE to smoothly receive and decode the PSCCH/PSSCH in the sidelink. The QCL relationship between antenna ports may have one of a total of four QCL types.

'QCL-typeA': {Doppler shift, Doppler spread, average delay, delay spread}
'QCL-typeB': {Doppler shift, Doppler spread}
'QCL-typeC': {Doppler shift, average delay}
'QCL-typeD': {Spatial RX parameter}

If some of the above-described QCL types are shared between two different antenna ports or if one antenna port refers to some of the QCL types of another antenna port, the UE may share parameters supported by the QCL types shared or referenced by the two antenna ports, and may assume that they share the same value.

Specifically, in various embodiments of the disclosure, the TCI state may be used for beam indication and beam management for PSCCH/PSSCH and SL CSI-RS. First, one RS ID may be configured for each TCI state. In this case, the RS ID may be an SL CSI-RS used as a beam reference in the disclosure. In addition, information on the QCL relationship may be configured for each TCI state. In the disclosure, the beam indication may be limited to sidelink unicast communication. First, the TCI state for the SL CSI-RS used as a beam reference may be configured through PC5-RRC. In a unicast link, the receiving UE may identify beam information by using the QCL information and the RS ID indicated by the TCI state to perform channel estimation and identify information of the beam. In addition, as described in the fourth embodiment, the transmitting UE may perform an operation of transmitting respective SL CSI-RS resources through different beams or the same beam based on multiple SL CSI-RS resource settings, and here the transmitting UE may perform beam tracking through multiple TCI state configurations for SL CSI-RS. For example, when the transmitting UE identifies the best transmission beam as a result of beam tracking through the fourth embodiment, the transmitting UE may indicate a beam having been used, to the receiving UE, through TCI state indication. In a case of the sidelink, since the PSCCH and the PSSCH are always transmitted at the same time, the beam indication for the PSCCH/PSSCH can be simultaneously performed using the result of beam tracking using the SL CSI-RS. The following FIG. 11A shows an embodiment of a beam indication method.

Figure 11A:
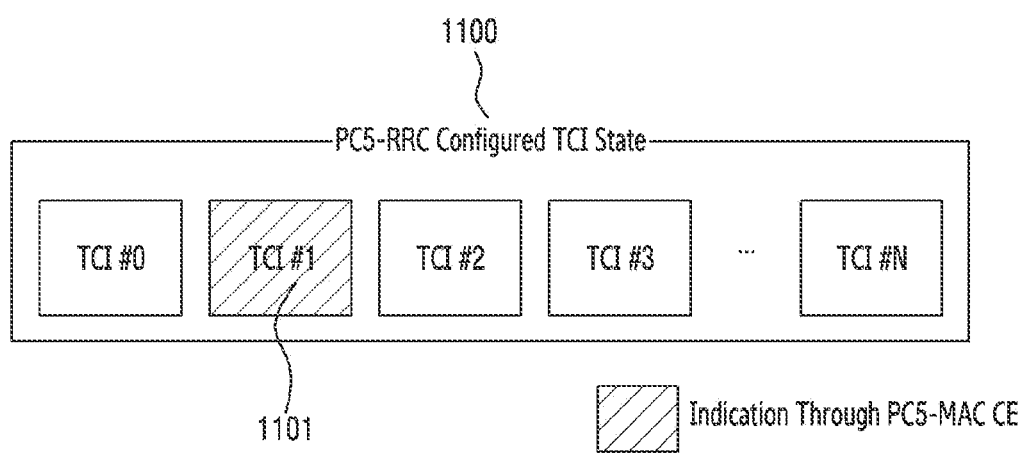
FIG. 11A illustrates a method of supporting beam indication for PSCCH/PSSCH in a sidelink in a wireless communication system according to various embodiments of the disclosure.

FIG. 11A illustrates a method of supporting beam indication for PSCCH/PSSCH in a sidelink in a wireless communication system according to various embodiments of the disclosure.

Referring to FIG. 11A, N TCI states may be configured through PC5-RRC (indicated by reference numeral 1100). In addition, as a result of beam tracking for N TCI states by using SL CSI-RS, the transmitting UE may indicate the best transmission beam to the receiving UE through PC5-MAC CE. In addition, when the best beam has been changed as a result of continuous beam tracking, information about the changed beam may be indicated by a TCI state.

Next, a method for determining a beam for a PSFCH in the sidelink will be described. As described with reference to FIG. 10A of the fourth embodiment, the receiving UE may transmit ACK/NACK information for the received PSSCH to the transmitting UE through the PSFCH. In this regard, a beamforming method is proposed with reference to FIG. 11B.

Figure 11B:
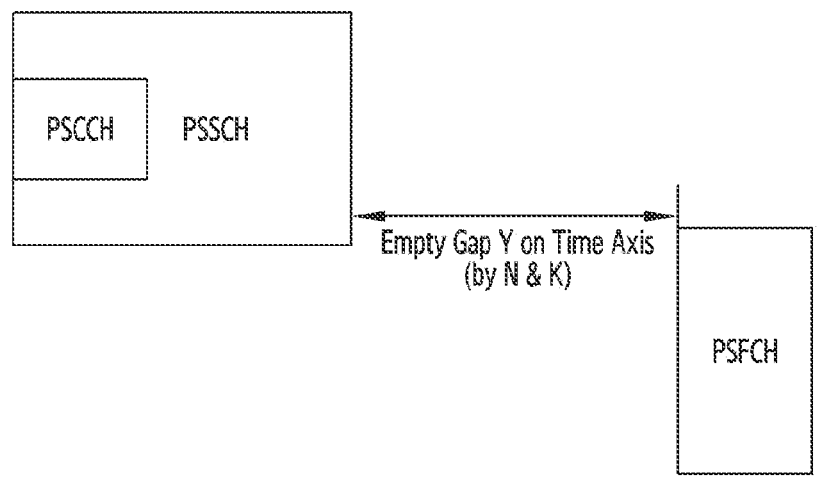
FIG. 11B illustrates a method of determining a beam for a PSFCH in a sidelink in a wireless communication system according to various embodiments of the disclosure.

FIG. 11B illustrates a method of determining a beam for a PSFCH in a sidelink in a wireless communication system according to various embodiments of the disclosure.

Referring to FIG. 11B, configuration periodicity N for a PSFCH resource configured in a resource pool, a PSSCH, a resource, and time offset value K regarding a PSFCH resource regarding the same may substantially increase empty gap Y on the time axis (time gap Y) regarding the PSFCH resource regarding the corresponding PSSCH. Therefore, with regard to the configured threshold value K, in case of Y K, the receiving UE may transmit the PSFCH by using a spatial domain transmission filter which is the same as a spatial domain receive filter used when receiving the PSSCH referenced by the PSFCH. On the other hand, in case of Y>K, it may not be appropriate to use the same spatial domain transmission filter as the spatial domain reception filter used when receiving the PSSCH referenced by the PSFCH. Therefore, in this case, the following alternatives may be considered.

Alternative 1: The receiving UE may transmit the PSFCH by using the same spatial domain transmission filter as the spatial domain reception filter used when receiving the most recently received PSSCH from the same transmitting UE.

Alternative 2: The receiving UE may transmit the PSFCH by using the same spatial domain transmission filter as the spatial domain reception filter used when receiving the most recently received SL CSI-RS from the same transmitting UE.

Alternative 1 may be used when, after transmission of the PSSCH referenced by the PSFCH, another PSSCH other than the PSSCH referenced by the PSFCH is transmitted from the same transmitting UE. In addition, alternative 2 may be used when the SL CSI-RS is transmitted after transmission of the PSSCH referenced by the PSFCH. Accordingly, if only one of the alternatives 1 and 2 above is satisfied, the alternative satisfying may be used. If both alternatives are satisfied, an alternative corresponding to a recently received case may be used, or alternative 1 may be used.

Sixth Embodiment

The sixth embodiment proposes a method for a receiving UE to report beam-related information to a transmitting UE in a sidelink. In this case, the beam-related information may be a part of sidelink channel state information (SL CSI). Specifically, the SL CSI information may include one or more of the following information.

RI
PMI
CQI
Beam information (CRI, RSRP)
Beam direction assist information (location, velocity)

In addition, a combination of some of the above SL CSI information may be reported together. This information may be included in the report quantity (reportQuantity) in the CSI framework described in the third embodiment. For example, the following information may be configured as reportQuantity.

cri-RI-PMI-CQI
cri-RI-LI-PMI-CQI
cri-RI-CQI
cri-RSRP
cri-RSRP-location-velocity

In addition, the following method may be considered for reporting the SL CSI information as described above.

Higher layer signaling (e.g., MAC CE)
Physical layer signaling (e.g., PSSCH)

In addition, when reporting beam-related information in the sidelink, periodic SL CSI reporting and aperiodic SL CSI reporting may be considered. In a case of aperiodic SL CSI reporting, the UE needs to request a PSSCH resource from the base station in order to report the SL CSI (mode1) or the UE needs to select the PSSCH resource through direct sensing (mode2). If periodic SL CSI reporting is configured, when the corresponding resource exists periodically, and at the same time when aperiodic SL CSI reporting is triggered, a method of reporting aperiodic SL CSI reporting to periodically configured SL CSI reporting resources may be considered. In this case, a method for performing frequency domain multiplexing (FDM) may be considered so that periodic SL CSI reporting and aperiodic SL CSI reporting do not overlap on the frequency axis. In a case of using the proposed method, it is possible to perform SL CSI reporting faster by reducing a delay time until receiving allocation of PSSCH resources for aperiodic SL CSI reporting.

In addition, when periodic SL CSI-RS is not supported, a method of using a result of HARQ ACK/NACK feedback or CSI feedback as a reference for changing a beam direction may be considered. For example, when a continuous NACK is repeated N times and fed back from the receiving UE, the transmitting UE may attempt to change a beam direction. Here, the value of N may be (pre-)configured in the resource pool.

Figure 12:
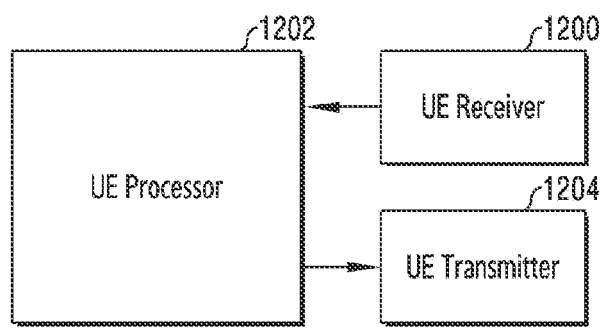
FIG. 12 illustrates a structure of a UE in a wireless communication system according to various embodiments of the disclosure.
Figure 13:
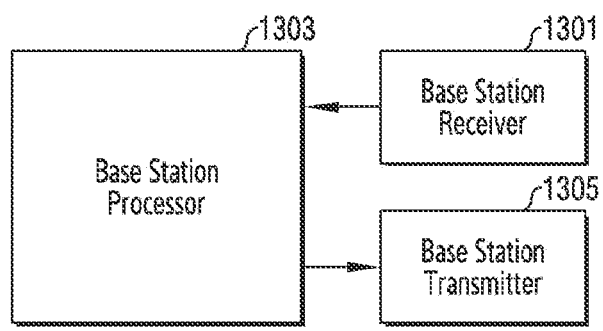
FIG. 13 illustrates a structure of a base station in a wireless communication system according to various embodiments of the disclosure.

FIGS. 12 and 13 illustrate the structures of a UE and a base station for performing various embodiments of the disclosure.

The UE and the base station include a transmitter, a receiver, and a processor, and the transmitter, the receiver, and the processor operate according to the method for performing beam management in a sidelink of the first to seventh embodiments described above.

FIG. 12 illustrates the structure of a UE in a wireless communication system according to various embodiments of the disclosure.

Referring to FIG. 12, a UE according to various embodiments of the disclosure includes a UE receiver 1200, a UE transmitter 1204, and a UE processor 1202. In various embodiments of the disclosure, the UE receiver 1200 and the UE transmitter 1204 may be collectively referred to as a transceiver 1200 or 1204.

The transceiver 1200 or 1204 may transmit or receive signals to or from a base station. The signal may include control information and data. To this end, the transceiver 1200 or 1204 may include an RF transmitter configured to perform up-conversion and amplification of a frequency of a transmitted signal, an RF receiver configured to perform low-noise amplification of a received signal and perform down-conversion of a frequency, and the like. Further, the transceiver 1200 or 1204 may receive a signal via a wireless channel, may output the signal to the UE processor 1202, and may transmit a signal output from the UE processor 1202 via the wireless channel.

The UE processor 1202 may control a series of procedures so as to enable a UE to perform operations according to various embodiments of the disclosure described above. The UE processor 1202 may be referred to as a controller. The UE processor 1202 may include at least one processor.

FIG. 13 illustrates a structure of a base station in a wireless communication system according to various embodiments of the disclosure.

Referring to FIG. 13, a base station according to various embodiments of the disclosure includes a base station receiver 1301, a base station transmitter 1305, and a base station processor 1303. In various embodiments of the disclosure, the base station receiver 1301 and the base station transmitter 1305 may be collectively referred to as the transceiver 1301 or 1305.

The transceiver 1301 or 1305 may transmit or receive signals to or from a UE. The signal may include control information and data. To this end, the transceiver 1301 or 1305 may include an RF transmitter configured to perform up-conversion and amplification of a frequency of a transmitted signal, an RF receiver configured to perform low-noise amplification of a received signal and perform down-conversion of a frequency, and the like. Further, the transceiver 1301 or 1305 may receive a signal via a wireless channel, may output the signal to the base station processor 1303, and may transmit a signal output from the base station processor 1303 via the wireless channel.

The base station processor 1303 may control a series of procedures so as to enable a base station to perform operations according to various embodiments of the disclosure described above. The base station processor 1303 may be referred to as a controller. The base station processor 1303 may include at least one processor.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The disclosure generally relates to a wireless communication system, and more particularly, to an apparatus and method for beam management of a sidelink in a wireless communication system.

The invention claimed is:

1. A method performed by a first user equipment (UE) in a wireless communication system, the method comprising:
    establishing a sidelink (SL) communication with a second UE, wherein the first UE is configured with first information for indicating a first time point in which a period for transmission of an SL channel state information-reference signal (CSI-RS) starts, and second information for indicating a second time point in which the transmission of the SL CSI-RS starts within the period based on the first time point;
    identifying a channel busy ratio (CBR) level of a channel for the SL communication;
    transmitting, to the second UE, SL CSI-RSs using beams based on the first information and the second information;
    receiving, from the second UE, a response message including information on a beam among the beams associated with, the SL CSI-RSs; and
    transmitting, to the second UE, a signal using the beam,
    wherein a number of the beams for the SL CSI-RSs is determined based on a maximum number of the beams, and
    wherein the maximum number of the beams is determined based on the CBR level.

2. The method of claim 1, wherein the signal includes at least one of a physical sidelink shared channel (PSSCH) or a physical sidelink control channel (PSCCH), and
    wherein, in case that location information of the second UE and speed information of the second UE are identified, directions of the beams for the SL CSI-RSs are determined based on the location information and the speed information.

3. The method of claim 1, wherein transmitting the SL CSI-RSs comprises:
    identifying a plurality of SL CSI-RS resources;
    mapping each of the beams to each of the plurality of SL CSI-RS resources; and
    transmitting, to the second UE, the SL CSI-RSs using the beams mapped with the plurality of SL CSI-RS resources.

4. The method of claim 1, wherein the SL CSI-RSs are transmitted to the second UE using different beams,
    wherein the response message further includes information on a plurality of CSI-RS resource indicators (CRIs) for the beams, and
    wherein the plurality of CRIs is mapped with reference signal received powers (RSRPs) of the SL CSI-RSs associated with the beams.

5. The method of claim 1, wherein the SL CSI-RSs are transmitted to the second UE using different beams, and
    wherein the response message further includes third information on a reference signal received power (RSRP) corresponding to a CRI for the beam and fourth information on differential RSRPs for first beams remaining after excluding the beam from the beams.

6. The method of claim 1, wherein the SL CSI-RSs are transmitted to the second UE based on a plurality of SL CSI-RS resource sets,
    wherein different beams are mapped to each of the plurality of SL CSI-RS resource sets, and
    wherein SL CSI-RS resources in each of the plurality of SL CSI-RS resource sets are mapped to a same beam.

7. A first user equipment (UE) in a wireless communication system, the first UE comprising:
    a transceiver; and
    a controller coupled with the transceiver and configured to:
        establish a sidelink (SL) communication with a second UE, wherein the first UE is configured with first information for indicating a first time point in which a period for transmission of an SL channel state information-reference signal (CSI-RS) starts, and second information for indicating a second time point in which the transmission of the SL CSI-RS starts within the period based on the first time point, identify a channel busy ratio (CBR) level of a channel for the SL communication, transmit, to the second UE, SL CSI-RSs using beams based on the first information and the second information, receive, from the second UE, a response message including information on a beam among the beams associated with the SL CSI-RSs, and transmit, to the second UE, a signal using the beam, wherein a number of the beams for the SL CSI-RSs is determined based on a maximum number of the beams, and wherein the maximum number of the beams is determined based on the CBR level.

8. The first UE of claim 7, wherein the signal includes at least one of a physical sidelink shared channel (PSSCH) or a physical sidelink control channel (PSCCH), and wherein, in case that location information of the second UE and speed information of the second UE are identified, directions of the beams for the SL CSI-RSs are determined based on the location information and the speed information.

9. The first UE of claim 7, wherein the controller is further configured to:

identify a plurality of SL CSI-RS resources;

map each of the beams to each of the plurality of SL CSI-RS resources; and transmit, to the second UE, the SL CSI-RSs using the beams mapped with the plurality of SL CSI-RS resources.

10. The first UE of claim 7, wherein the SL CSI-RSs are transmitted to the second UE using different beams, wherein the response message further includes information on a plurality of CSI-RS resource indicators (CRIs) for the beams, and wherein the plurality of CRIs is mapped with reference signal received powers (RSRPs) of the SL CSI-RSs associated with the beams.

11. The first UE of claim 7, wherein the SL CSI-RSs are transmitted to the second UE using different beams, and wherein the response message further includes third information on a reference signal received power (RSRP) corresponding to a CRI for the beam and fourth information on differential RSRPs for first beams remaining after excluding the beam from the beams.

12. The first UE of claim 7, wherein the SL CSI-RSs are transmitted to the second UE based on a plurality of SL CSI-RS resource sets, wherein different beams are mapped to each of the plurality of SL CSI-RS resource sets, and wherein SL CSI-RS resources in each of the plurality of SL CSI-RS resource sets are mapped to a same beam.

* * * * *